US012793966B2

(12) United States Patent
Meng

(10) Patent No.: US 12,793,966 B2
(45) Date of Patent: Nov. 10, 2026

(54) SUPERIOR LITHIUM METAL ANODES BY ATOMIC AND MOLECULAR LAYER DEPOSITION

(71) Applicant: BOARD OF TRUSTEES OF THE UNIVERSITY OF ARKANSAS, Fayetteville, AR (US)

(72) Inventor: Xiangbo Meng, Fayetteville, AR (US)

(73) Assignee: Board of Trustees of the University of Arkansas, Fayetteville, AR (US)

( * ) Notice: Subject to any disclaimer, the term of this patent is extended or adjusted under 35 U.S.C. 154(b) by 611 days.

(21) Appl. No.: 17/584,316

(22) Filed: Jan. 25, 2022

(65) Prior Publication Data

US 2022/0238857 A1 Jul. 28, 2022

Related U.S. Application Data

(60) Provisional application No. 63/141,937, filed on Jan. 26, 2021.

(51) Int. Cl.
*H01M 4/134* (2010.01)
*H01M 4/137* (2010.01)
*H01M 10/052* (2010.01)

(52) U.S. Cl.
CPC ........... *H01M 4/134* (2013.01); *H01M 4/137* (2013.01); *H01M 10/052* (2013.01)

(58) Field of Classification Search
CPC .... H01M 4/134; H01M 4/137; H01M 10/052; H01M 4/382; H01M 4/366; H01M 4/62
See application file for complete search history.

(56) References Cited

U.S. PATENT DOCUMENTS

| | | | | |
|---|---|---|---|---|
| 5,755,985 | A * | 5/1998 | Vallee | C08F 220/00 429/189 |
| 10,553,874 | B2 * | 2/2020 | Elam | H01M 10/4235 |
| 11,990,609 | B2 * | 5/2024 | Basu | H01M 4/62 |
| 2013/0337259 | A1 * | 12/2013 | Carcia | C09D 5/00 524/610 |
| 2015/0364747 | A1 * | 12/2015 | Elam | H01M 10/0562 204/192.1 |
| 2017/0263935 | A1 * | 9/2017 | Kozen | H01M 4/62 |
| 2022/0028686 | A1 * | 1/2022 | Bhuyan | C23C 16/45527 |

OTHER PUBLICATIONS

Nisula et. al. In situ lithiated quinone cathode for ALD/MLDfabricated high-power thin-film battery. J. Mater. Chem. A, 2018, 6, 7027 (Year: 2018).*

Meng and Elam. "Atomic-Scale Rational Designs of Superionic Sulfide-Based Solid-State Electrolytes by Atomic Layer Deposition." 2019 Meet. Abstr. MA2019-01 155. (Year: 2019).*

Kazyak et al. "Molecular layer deposition of Li-ion conducting 'Lithicone' solid electrolytes." Chem. Commun., 2020, 56, 15537 (Year: 2020).*

(Continued)

*Primary Examiner* — Michael L Dignan
(74) *Attorney, Agent, or Firm* — Shackelford, McKinley & Norton, LLP

(57) ABSTRACT

Lithium-containing polymeric films and superionic inorganic lithium-conductors for protecting lithium metal electrodes, which lithium metal electrodes have little to no formation of SEI and dendrite growth.

13 Claims, 26 Drawing Sheets

(56) References Cited

OTHER PUBLICATIONS

Heiska et al. "CO2-based atomic/molecular layer deposition of lithium ethylene carbonate thin films." Nanoscale Adv., 2020, 2, 2441 (Year: 2020).*
Zhang, S., Status, opportunities, and challenges of electrochemical energy storage. *Frontiers in Energy Research* 2013, 1, 8.
Blomgren, G. E., The development and future of lithium ion batteries. *J. Electrochem. Soc.* 2017, 164 (1), A5019-A5025.
Seh, Z. W.; Sun, Y.; Zhang, Q.; Cui, Y., Designing high-energy lithium-sulfur batteries. *Chem. Soc. Rev.* 2016, 45 (20), 5605-5634.
Crabtree, G.; Kócs, E.; Trahey, L., The energy-storage frontier: Lithium-ion batteries and beyond. *MRS Bull.* 2015, 40 (12), 1067-1078.
Thackeray, M. M.; Wolverton, C.; Isaacs, E. D., Electrical energy storage for transportation-approaching the limits of, and going beyond, lithium-ion batteries. *Energy Environ. Sci.* 2012, 5 (7), 7854-7863.
Tarascon, J. M.; Armand, M., Issues and challenges facing rechargeable lithium batteries. *Nature* 2001, 414 (6861), 359-367.
Trahey, L.; Brushett, F. R.; Balsara, N. P.; Ceder, G.; Cheng, L.; Chiang, Y.-M.; Hahn, N. T.; Ingram, B. J.; Minteer, S. D.; Moore, J. S.; Mueller, K. T.; Nazar, L. F.; Persson, K. A.; Siegel, D. J.; Xu, K.; Zavadil, K. R.; Srinivasan, V.; Crabtree, G. W., Energy storage emerging: A perspective from the Joint Center for Energy Storage Research. *Proceedings of the National Academy of Sciences* 2020, 117 (23), 12550-12557.
Ruiz, V.; Pfrang, A.; Kriston, A.; Omar, N.; Van den Bossche, P.; Boon-Brett, L., A review of international abuse testing standards and regulations for lithium ion batteries in electric and hybrid electric vehicles. *Renew. Sust. Energ. Rev.* 2018, 81, 1427-1452.
Wen, J.; Yu, Y.; Chen, C., A Review on Lithium-Ion Batteries Safety Issues: Existing Problems and Possible Solutions. *Materials Express* 2012, 2 (3), 197-212.
Balakrishnan, P. G.; Ramesh, R.; Prem Kumar, T., Safety mechanisms in lithium-ion batteries. *J. Power Sources* 2006, 155 (2), 401-414.
Xu, K., Nonaqueous liquid electrolytes for lithium-based rechargeable batteries. *Chem. Rev.* 2004, 104 (10), 4303-4418.
Xu, K., Electrolytes and interphases in Li-ion batteries and beyond. *Chem. Rev.* 2014, 114 (23), 11503-11618.
Palacin, M. R., Understanding ageing in Li-ion batteries: a chemical issue. *Chem. Soc. Rev.* 2018.
Zhang, S. S., Liquid electrolyte lithium/sulfur battery: Fundamental chemistry, problems, and solutions. *J. Power Sources* 2013, 231, 153-162.
Hagen, M.; Hanselmann, D.; Ahlbrecht, K.; Maça, R.; Gerber, D.; Tübke, J., Lithium-sulfur cells: The gap between the state-of-the-art and the requirements for high energy battery cells. *Adv. Energy Mater.* 2015, 5 (16), 1401986.
Bruce, P. G.; Freunberger, S. A.; Hardwick, L. J.; Tarascon, J.-M., Li—$O_2$ and Li—S batteries with high energy storage. *Nat Mater* 2012, 11 (1), 19-29.
Guo, Y.; Li, H.; Zhai, T., Reviving lithium-metal anodes for next-generation high-energy batteries. *Adv. Mater.* 2017, 29 (29), 1700007.
Xu, W.; Wang, J.; Ding, F.; Chen, X.; Nasybulin, E.; Zhang, Y.; Zhang, J.-G., Lithium metal anodes for rechargeable batteries. *Energy Environ. Sci.* 2014, 7 (2), 513-537.
Lin, D.; Liu, Y.; Cui, Y., Reviving the lithium metal anode for high-energy batteries. *Nature Nanotechnoloy* 2017, 12, 194.
Winter, M., The solid electrolyte interphase—the most important and the least understood solid electrolyte in rechargeable Li batteries. *Z. Phys. Chem.* 2009, 223 (10-11), 1395-1406.
Brissot, C.; Rosso, M.; Chazalviel, J. N.; Lascaud, S., Dendritic growth mechanisms in lithium/polymer cells. *J. Power Sources* 1999, 81-82, 925-929.
Schedlbauer, T.; Rodehorst, U. C.; Schreiner, C.; Gores, H. J.; Winter, M., Blends of lithium bis(oxalato)borate and lithium tetrafluoroborate: Useful substitutes for lithium difluoro(oxalato)borate in electrolytes for lithium metal based secondary batteries? *Electrochim. Acta* 2013, 107, 26-32.
Aurbach, D.; Zinigrad, E.; Cohen, Y.; Teller, H., A short review of failure mechanisms of lithium metal and lithiated graphite anodes in liquid electrolyte solutions. *Solid State Ion.* 2002, 148 (3), 405-416.
Goodenough, J. B.; Kim, Y., Challenges for rechargeable Li batteries. *Chem. Mater.* 2010, 22 (3), 587-603.
Cohen, Y. S.; Cohen, Y.; Aurbach, D., Micromorphological studies of lithium electrodes in alkyl carbonate solutions using in situ atomic force microscopy. *The Journal of Physical Chemistry B* 2000, 104 (51), 12282-12291.
Manthiram, A.; Fu, Y.; Chung, S.-H.; Zu, C.; Su, Y.-S., Rechargeable lithium-sulfur batteries. *Chem. Rev.* 2014, 11751-11787.
Manthiram, A.; Fu, Y.; Su, Y.-S., Challenges and prospects of lithium-sulfur batteries. *Acc. Chem. Res.* 2013, 46 (5), 1125-1134.
Meng, X., An overview of molecular layer deposition for organic and organic-inorganic hybrid materials: Mechanisms, growth characteristics, and promising applications. *J. Mater. Chem. A* 2017, 5 (35), 18326-18378.
George, S. M., Atomic layer deposition: An overview. *Chem. Rev.* 2010, 110 (1), 111-31.
Zhuiykov, S.; Akbari, M. K.; Hai, Z.; Xue, C.; Xu, H.; Hyde, L., Wafer-scale fabrication of conformal atomic-layered $TiO_2$ by atomic layer deposition using tetrakis(dimethylamino)titanium and $H_2O$ precursors. *Materials & Design* 2017, 120, 99-108.
Kim, Y.; Song, J.-G.; Park, Y. J.; Ryu, G. H.; Lee, S. J.; Kim, J. S.; Jeon, P. J.; Lee, C. W.; Woo, W. J.; Choi, T.; Jung, H.; Lee, H.-B.-R.; Myoung, J.-M.; Im, S.; Lee, Z.; Ahn, J.-H.; Park, J.; Kim, H., Self-limiting layer synthesis of transition metal dichalcogenides. *Sci. Rep.* 2016, 6, 18754.
Elam, J. W.; Routkevitch, D.; Mardilovich, P. P.; George, S. M., Conformal coating on ultrahigh-aspect-ratio nanopores of anodic alumina by atomic layer deposition. *Chem. Mater.* 2003, 15 (18), 3507-3517.
Elam, J. W.; Xiong, G.; Han, C. Y.; Wang, H. H.; Birrell, J. P.; Welp, U.; Hryn, J. N.; Pellin, M. J.; Baumann, T. F.; Poco, J. F.; Satcher, J. H., Atomic layer deposition for the conformal coating of nanoporous materials. J. Nanomater. 2006, 2006, 64501.
Lim, B. S.; Rahtu, A.; Gordon, R. G., Atomic layer deposition of transition metals. Nature Materials 2003, 2 (11), 749-754.
Kim, H., Atomic layer deposition of metal and nitride thin films: Current research efforts and applications for semiconductor device processing. J. Vac. Sci. Technol. B 2003, 21 (6), 2231-2261.
Niinistö, L.; Nieminen, M.; Päiväsaari, J.; Niinistö, J.; Putkonen, M.; Nieminen, M., Advanced electronic and optoelectronic materials by atomic layer deposition: An overview with special emphasis on recent progress in processing of high-k dielectrics and other oxide materials. Phys. Status Solidi (a) 2004, 201 (7), 1443-1452.
Dasgupta, N. P.; Meng, X.; Elam, J. W.; Martinson, A. B., Atomic layer deposition of metal sulfide materials. Acc. Chem. Res. 2015, 48 (2), 341-8.
Ylilammi, M.; Ranta-aho, T., Metal fluoride thin films prepared by atomic layer deposition. J. Electrochem. Soc. 1994, 141 (5), 1278-1284.
McDaniel, M. D.; Ngo, T. Q.; Hu, S.; Posadas, A.; Demkov, A. A.; Ekerdt, J. G., Atomic layer deposition of perovskite oxides and their epitaxial integration with Si, Ge, and other semiconductors. Appl. Phys. Rev. 2015, 2 (4), 041301.
Putkonen, M.; Aaltonen, T.; Alnes, M.; Sajavaara, T.; Nilsen, O.; Fjellvag, H., Atomic layer deposition of lithium containing thin films. J. Mater. Chem. 2009, 19 (46), 8767-8771.
Cavanagh, A. S.; Lee, Y.; Yoon, B.; George, S. M., Atomic layer deposition of LiOH and Li2CO3 using lithium t-butoxide as the lithium source. Atomic Layer Deposition Applications 6 2010, 33 (2), 223-229.
Aaltonen, T.; Nilsen, O.; Magraso, A.; Fjellvag, H., Atomic layer deposition of Li2O—Al2O3 thin films. Chem. Mater. 2011, 23 (21), 4669-4675.
Liu, J.; Banis, M. N.; Li, X. F.; Lushington, A.; Cai, M.; Li, R. Y.; Sham, T. K.; Sun, X. L., Atomic layer deposition of lithium tantalate solid-state electrolytes. J. Phys. Chem. C 2013, 117 (39), 20260-20267.

(56) References Cited

OTHER PUBLICATIONS

Thimsen, E.; Riha, S. C.; Baryshev, S. V.; Martinson, A. B. F.; Elam, J. W.; Pellin, M. J., Atomic layer deposition of the quaternary chalcogenide Cu2ZnSnS4. Chem. Mater. 2012, 24 (16), 3188-3196.
Meng, X. B.; Liu, J.; Li, X. F.; Banis, M. N.; Yang, J. L.; Li, R. Y.; Sun, X. L., Atomic layer deposited Li4Ti5O12 on nitrogen-doped carbon nanotubes. Rsc Advances 2013, 3 (20), 7285-7288.
Miikkulainen, V.; Nilsen, O.; Laitinen, M.; Sajavaara, T.; Fjellvag, H., Atomic layer deposition of LixTiyOz thin films. RSC Advances 2013, 3 (20), 7537-7542.
Bugot, C.; Broussillou, C.; Sorba, A.; Parissi, L.; Schneider, N.; Lincot, D.; Donsanti, F., Temperature effect during atomic layer deposition of zinc oxysulfide —Zn(O,S) buffer layers on Cu(In,Ga)(S,Se)2 synthesized by co-evaporation and electro-deposition techniques. Photovoltaic Specialist Conference (PVSC), 2015 IEEE 42nd 2015, 1-6.
Puurunen, R. L., Surface chemistry of atomic layer deposition: A case study for the trimethylaluminum/water process. J. Appl. Phys. 2005, 97 (12), 121301.
Miikkulainen, V.; Leskelä, M.; Ritala, M.; Puurunen, R. L., Crystallinity of inorganic films grown by atomic layer deposition: Overview and general trends. J. Appl. Phys. 2013, 113 (2), 021301.
Detavernier, C.; Dendooven, J.; Sree, S. P.; Ludwig, K. F.; Martens, J. A., Tailoring nanoporous materials by atomic layer deposition. Chem. Soc. Rev. 2011, 40 (11), 5242-5253.
Bernal Ramos, K.; Saly, M. J.; Chabal, Y. J., Precursor design and reaction mechanisms for the atomic layer deposition of metal films. Coord. Chem. Rev. 2013, 257 (23-24), 3271-3281.
Leskelä, M.; Ritala, M., Atomic layer deposition (ALD): From precursors to thin film structures. Thin Solid Films 2002, 409 (1), 138-146.
Suntola, T., Atomic layer epitaxy. Mater Sci Rep 1989, 4 (5), 261-312.
Kazyak, E.; Chen, K.-H.; Davis, A. L.; Yu, S.; Sanchez, A. J.; Lasso, J.; Bielinski, A. R.; Thompson, T.; Sakamoto, J.; Siegel, D. J.; Dasgupta, N. P., Atomic layer deposition and first principles modeling of glassy Li3BO3—Li2CO3 electrolytes for solid-state Li metal batteries. J. Mater. Chem. A 2018, 6 (40), 19425-19437.
Cai, J.; Han, X.; Wang, X.; Meng, X., Atomic layer deposition of two-dimensional layered materials: Processes, growth mechanisms, and characteristics. Matter 2020, 2, 587-630.
Zhu, C.; Han, K.; Geng, D.; Ye, H.; Meng, X., Achieving high-performance silicon anodes of lithium-ion batteries via atomic and molecular layer deposited surface coatings: an overview. Electrochim. Acta 2017, 251, 710-728.
Meng, X., Towards high-energy and durable lithium-ion batteries via atomic layer deposition: elegantly atomic-scale material design and surface modification. Nanotechnology 2015, 26 (2), 020501.
Meng, X.; Wang, X.; Geng, D.; Ozgit-Akgun, C.; Schneider, N.; Elam, J. W., Atomic layer deposition for nanomaterial synthesis and functionalization in energy technology. Mater. Horiz. 2017, 4 (2), 133-154.
Meng, X., Atomic layer deposition of solid-state electrolytes for next-generation lithium-ion batteries and beyond: Opportunities and challenges. Energy Storage Materials 2020, 30, 296-328.
Sun, Q.; Lau, K. C.; Geng, D.; Meng, X., Atomic and molecular layer deposition for superior lithium-sulfur batteries: Strategies, performance, and mechanisms. Batteries Supercaps, doi:10.1002/batt.201800024.
Meng, X., Atomic-scale surface modifications and novel electrode designs for high-performance sodium-ion batteries via atomic layer deposition. J. Mater. Chem. A 2017, 5, 10127-10149.
Meng, X., Atomic and molecular layer deposition in pursuing better batteries. J. Mater. Res. 2020, 1-24.
Kozen, A. C.; Lin, C.-F.; Pearse, A. J.; Schroeder, M. A.; Han, X.; Hu, L.; Lee, S.-B.; Rubloff, G. W.; Noked, M., Next-generation lithium metal anode engineering via atomic layer deposition. ACS Nano 2015, 9 (6), 5884-5892.
Kazyak, E.; Wood, K. N.; Dasgupta, N. P., Improved cycle life and stability of lithium metal anodes through ultrathin atomic layer deposition surface treatments. Chem. Mater. 2015, 27 (18), 6457-6462.
Lin, C.-F.; Kozen, A. C.; Noked, M.; Liu, C.; Rubloff, G. W., ALD protection of Li-metal anode surfaces—Quantifying and preventing chemical and electrochemical corrosion in organic solvent. Advanced Materials Interfaces 2016, 3 (21), 1600426.
Zhang, Y.; Liu, B.; Hitz, E.; Luo, W.; Yao, Y.; Li, Y.; Dai, J.; Chen, C.; Wang, Y.; Yang, C.; Li, H.; Hu, L., A carbon-based 3D current collector with surface protection for Li metal anode. Nano Research 2017, 10 (4), 1356-1365.
Chen, L.; Connell, J. G.; Nie, A.; Huang, Z.; Zavadil, K. R.; Klavetter, K. C.; Yuan, Y.; Sharifi-Asl, S.; Shahbazian-Yassar, R.; Libera, J. A.; Mane, A. U.; Elam, J. W., Lithium metal protected by atomic layer deposition metal oxide for high performance anodes. J. Mater. Chem. A 2017, 5 (24), 12297-12309.
Cao, Y.; Meng, X.; Elam, J. W., Atomic layer deposition of LixAlyS solid-state electrolytes for stabilizing lithium-metal anodes. ChemElectroChem 2016, 3, 858-863.
Harrison, K. L.; Zavadil, K. R.; Hahn, N. T.; Meng, X.; Elam, J. W.; Leenheer, A.; Zhang, J.-G.; Jungjohann, K. L., Lithium self-discharge and its prevention: Direct visualization through in situ electrochemical scanning transmission electron microscopy. ACS Nano 2017, 11 (11), 11194-11205.
Chen, L.; Huang, Z.; Shahbazian-Yassar, R.; Libera, J. A.; Klavetter, K. C.; Zavadil, K. R.; Elam, J. W., Directly formed alucone on lithium metal for high-performance Li batteries and Li—S batteries with high sulfur mass loading. ACS Appl. Mater. Interfaces 2018, 10 (8), 7043-7051.
Zhao, Y.; Goncharova, L. V.; Sun, Q.; Li, X.; Lushington, A.; Wang, B.; Li, R.; Dai, F.; Cai, M.; Sun, X., Robust metallic lithium anode protection by the molecular-layer-deposition technique. Small Methods 2018, 2 (5), 1700417.
Sun, Y.; Zhao, Y.; Wang, J.; Liang, J.; Wang, C.; Sun, Q.; Lin, X.; Adair, K. R.; Luo, J.; Wang, D.; Li, R.; Cai, M.; Sham, T.-K.; Sun, X., A Novel Organic "Polyurea" Thin Film for Ultralong-Life Lithium-Metal Anodes via Molecular-Layer Deposition. Adv. Mater. 2019, 31 (4), 1806541.
Zhao, Y.; Amirmaleki, M.; Sun, Q.; Zhao, C.; Codirenzi, A.; Goncharova, L. V.; Wang, C.; Adair, K.; Li, X.; Yang, X.; Zhao, F.; Li, R.; Filleter, T.; Cai, M.; Sun, X., Natural SEI-inspired dual-protective layers via atomic/molecular layer deposition for long-life metallic lithium anode. Matter 2019, 1 (5), 1215-1231.
Li, X.; Lushington, A.; Liu, J.; Li, R.; Sun, X., Superior stable sulfur cathodes of Li—S batteries enabled by molecular layer deposition. Chem. Commun. 2014, 50 (68), 9757-9760.
Li, X.; Lushington, A.; Sun, Q.; Xiao, W.; Liu, J.; Wang, B.; Ye, Y.; Nie, K.; Hu, Y.; Xiao, Q.; Li, R.; Guo, J.; Sham, T.-K.; Sun, X., Safe and durable high-temperature lithium-sulfur batteries via molecular layer deposited coating. Nano Lett. 2016, 16 (6), 3545-3549.
Meng, X.; Cao, Y.; Libera, J. A.; Elam, J. W., Atomic layer deposition of aluminum sulfide: Growth mechanism and electrochemical evaluation in lithium-ion batteries. Chem. Mater. 2017, 29 (21), 9043-9052.
Meng, X.; Comstock, D. J.; Fister, T. T.; Elam, J. W., Vapor-phase atomic-controllable growth of amorphous Li2S for high-performance lithium-sulfur batteries. ACS Nano 2014, 8 (10), 10963-10972.
Meng, X.; Elam, J. W., Atomic-scale rational designs of superionic sulfide-based solid-state electrolytes by atomic layer deposition. ECS Meeting Abstracts 2019, MA2019-01 (2), 155.

* cited by examiner

FIG. 4A
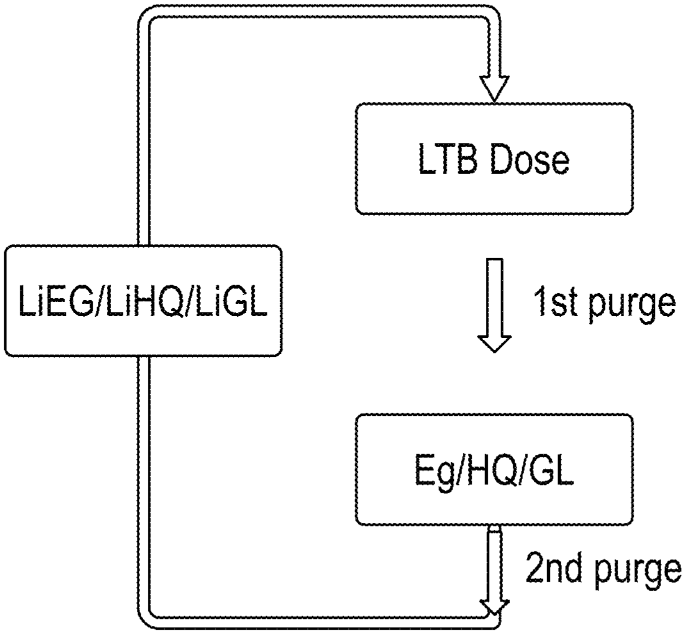
FIG. 4B
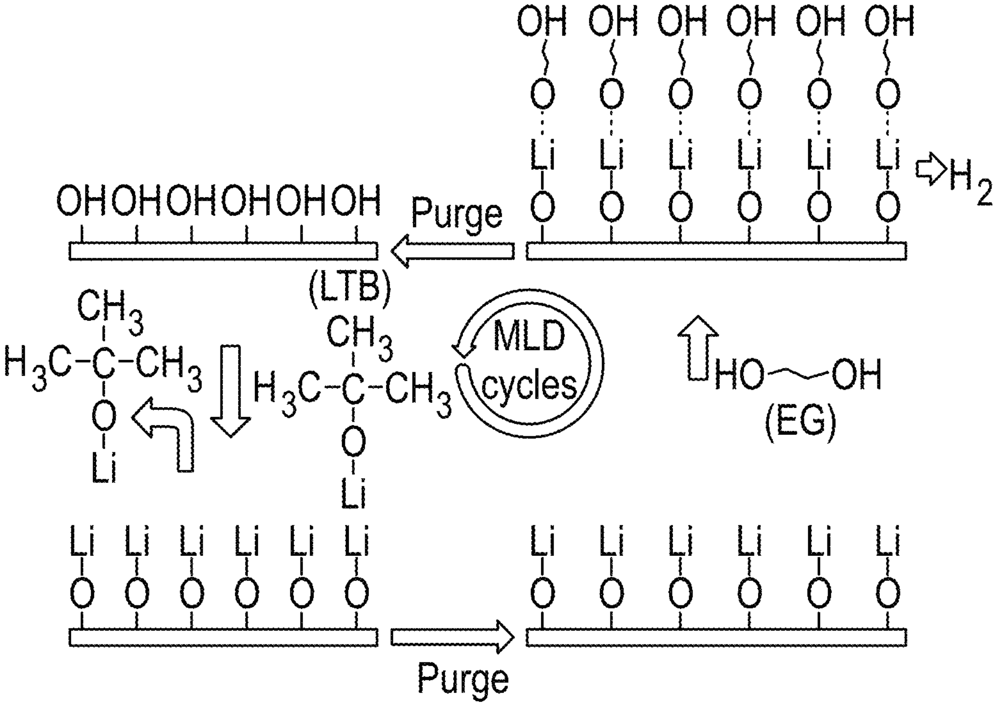
FIG. 4

FIG. 4C
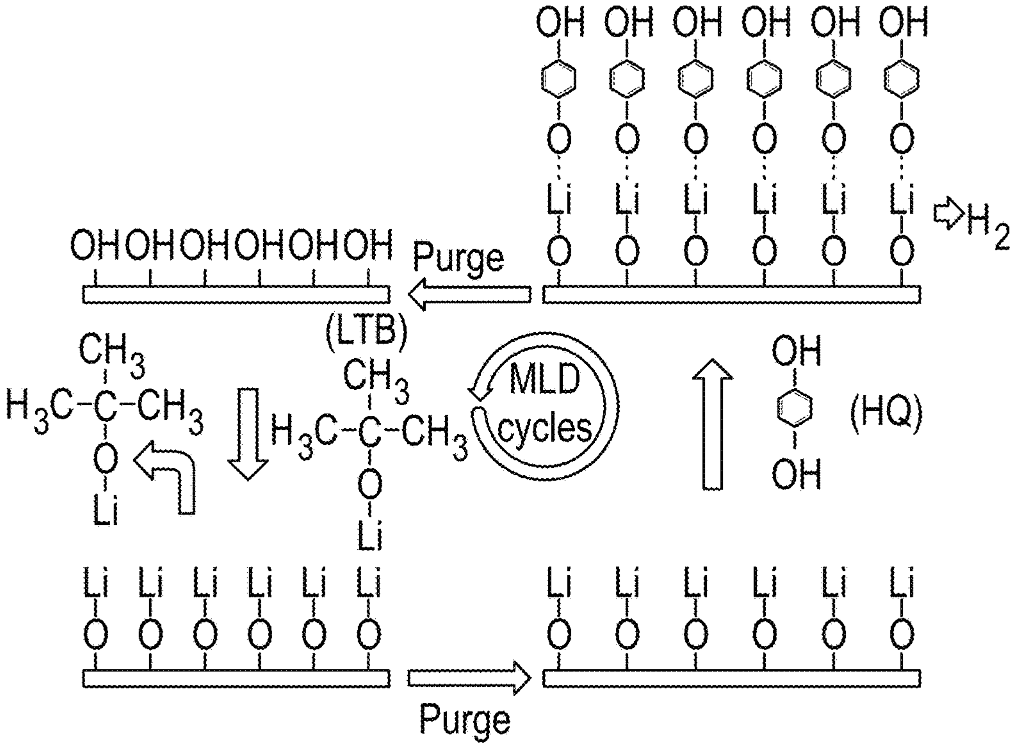
FIG. 4D
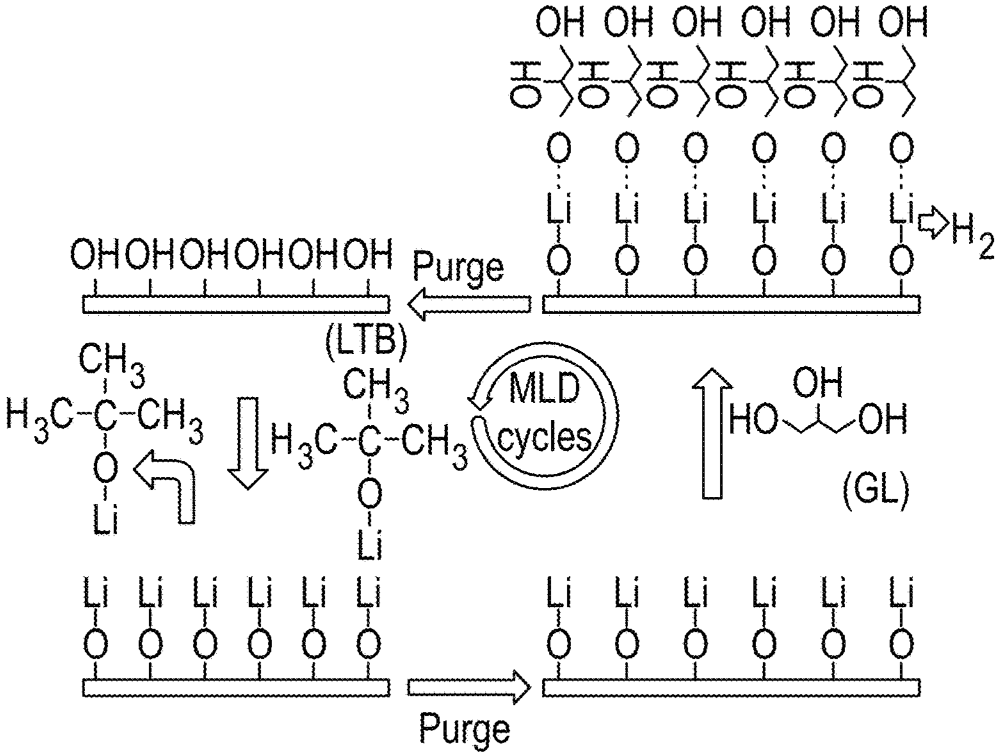
FIG. 4 CONTINUED

FIG. 8B
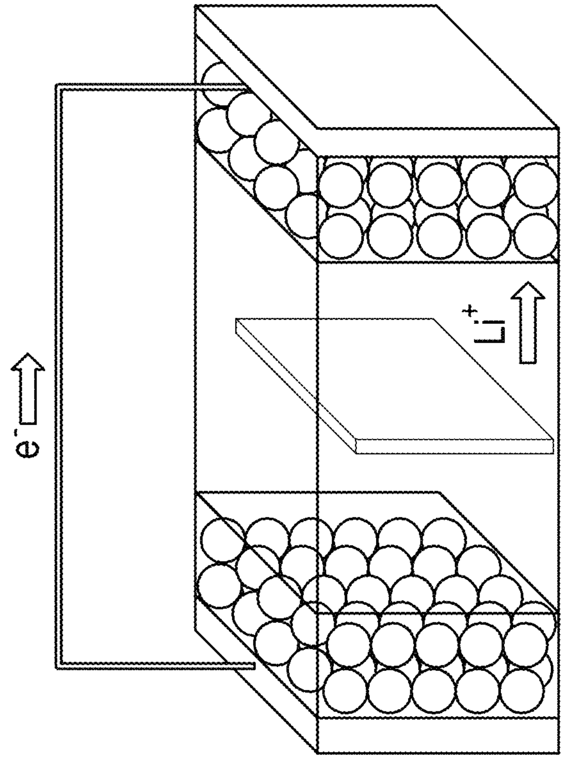
FIG. 8A
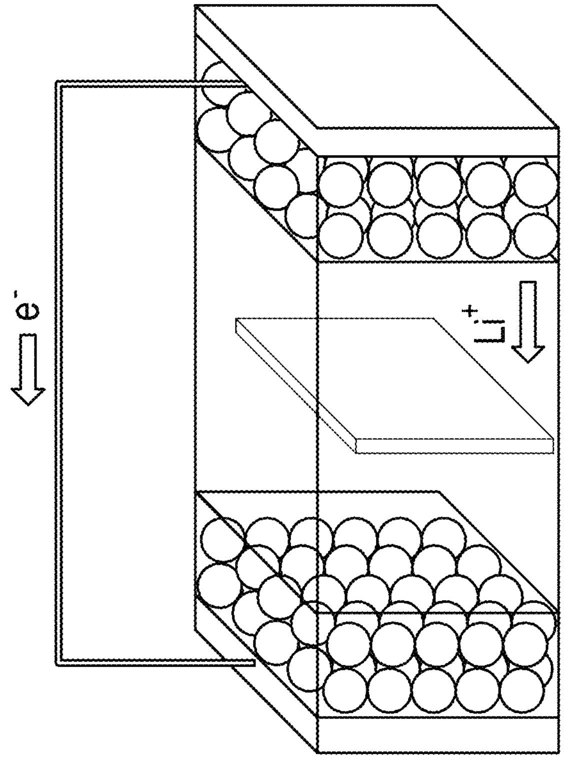
FIG. 8

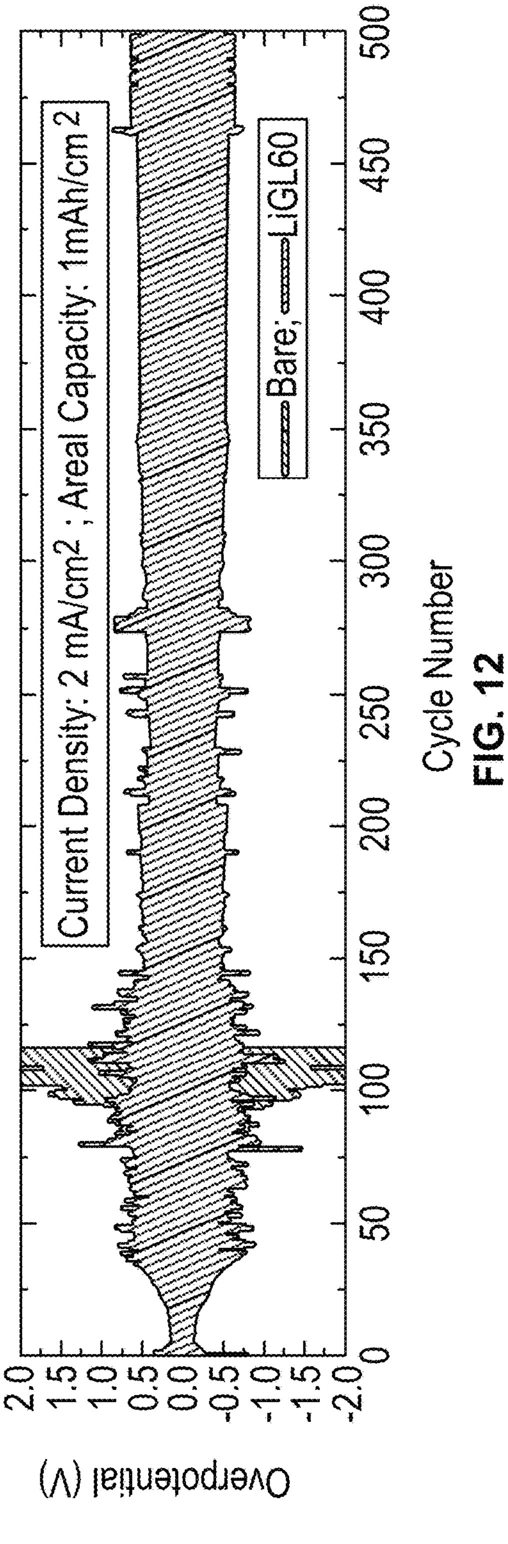
FIG. 12
FIG. 13A
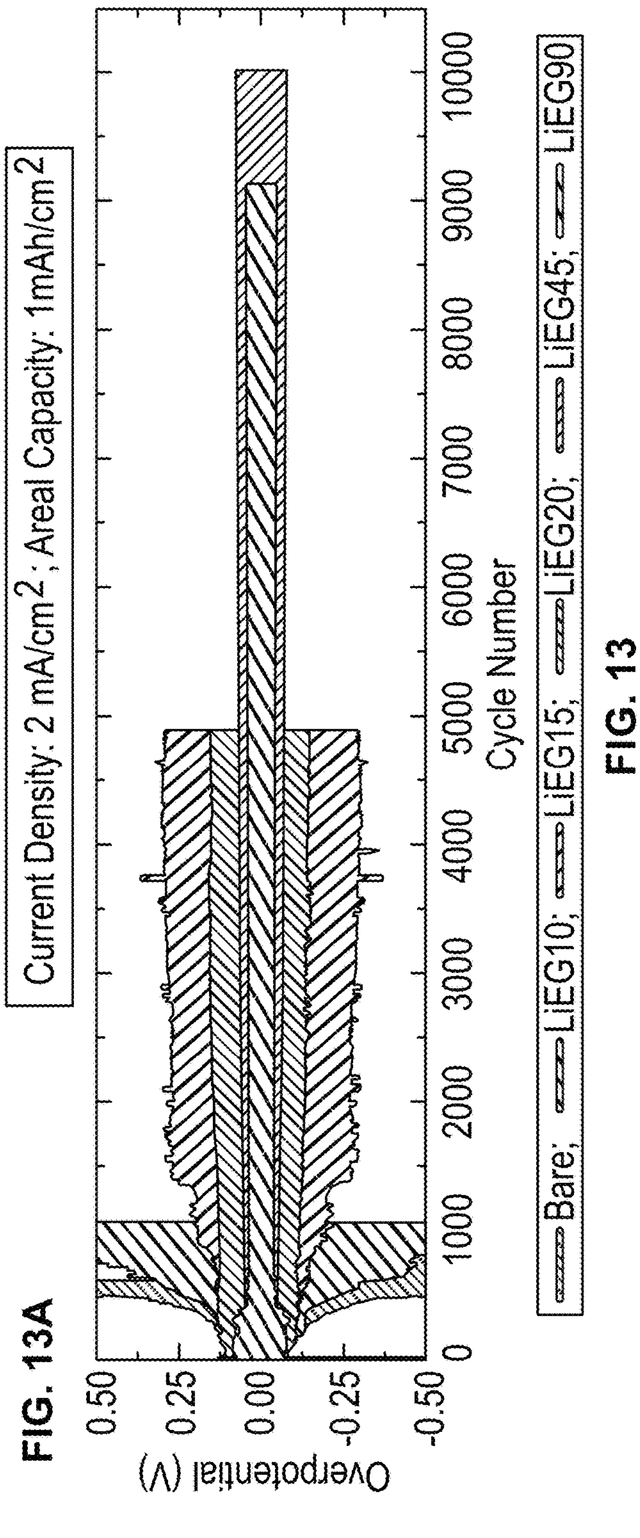
FIG. 13

FIG. 13B
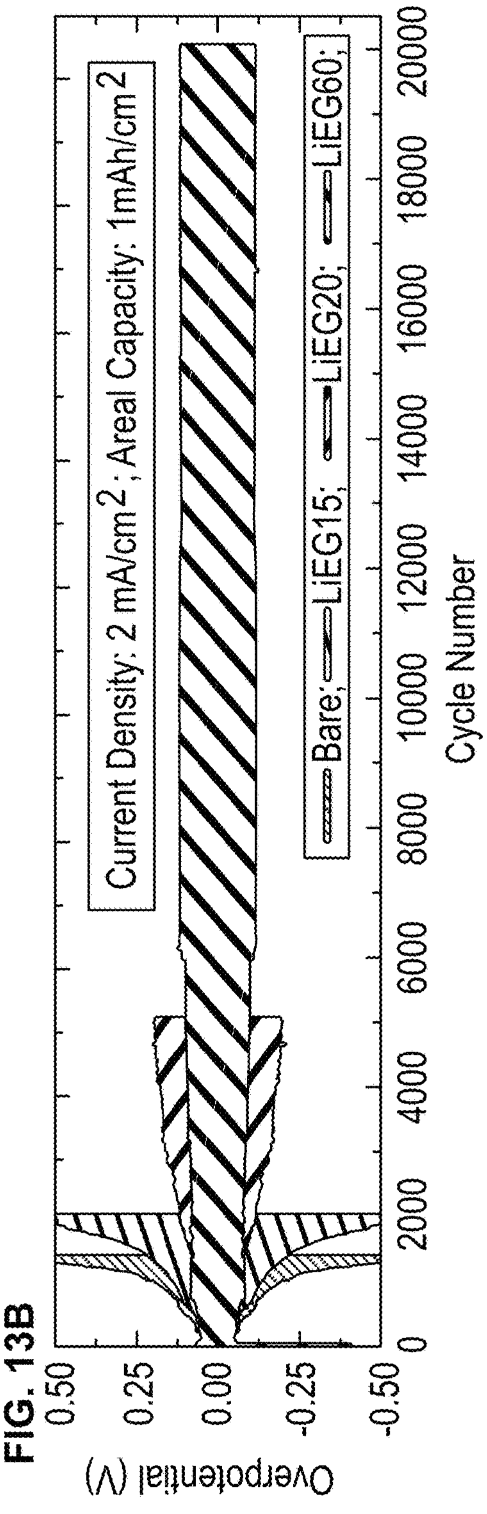
FIG. 13C
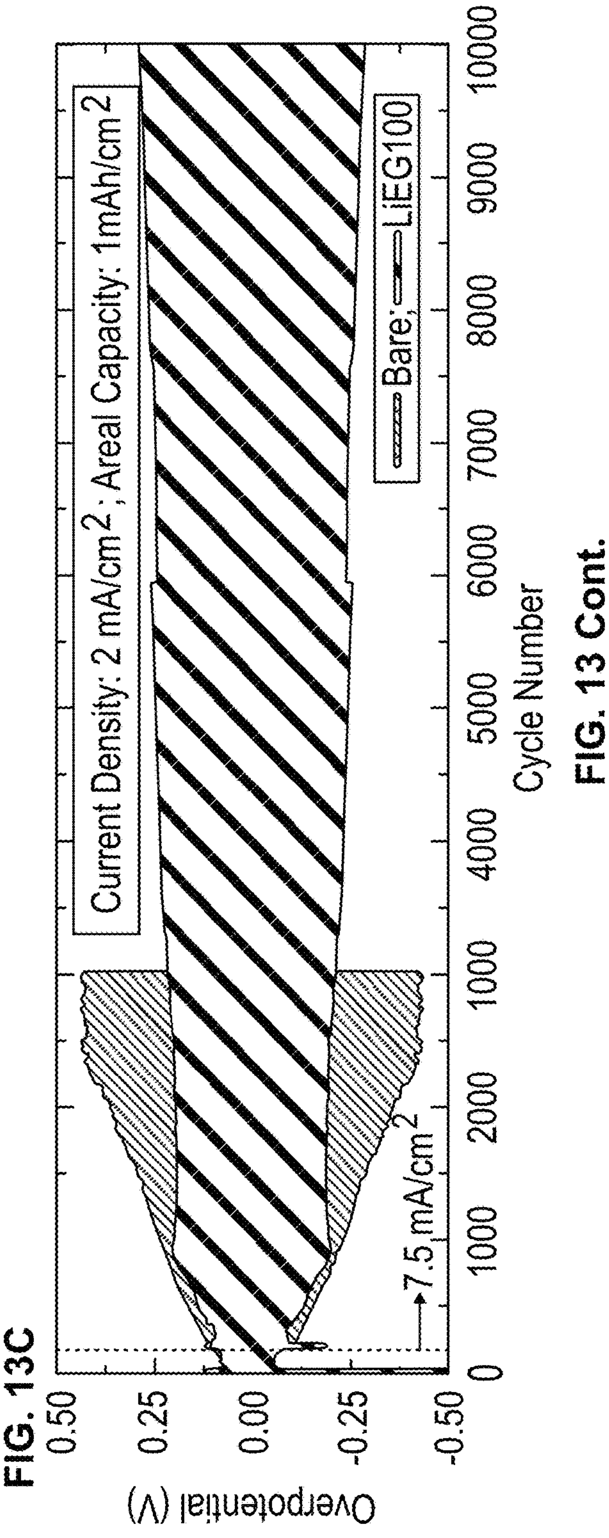
FIG. 13 Cont.

FIG. 15A
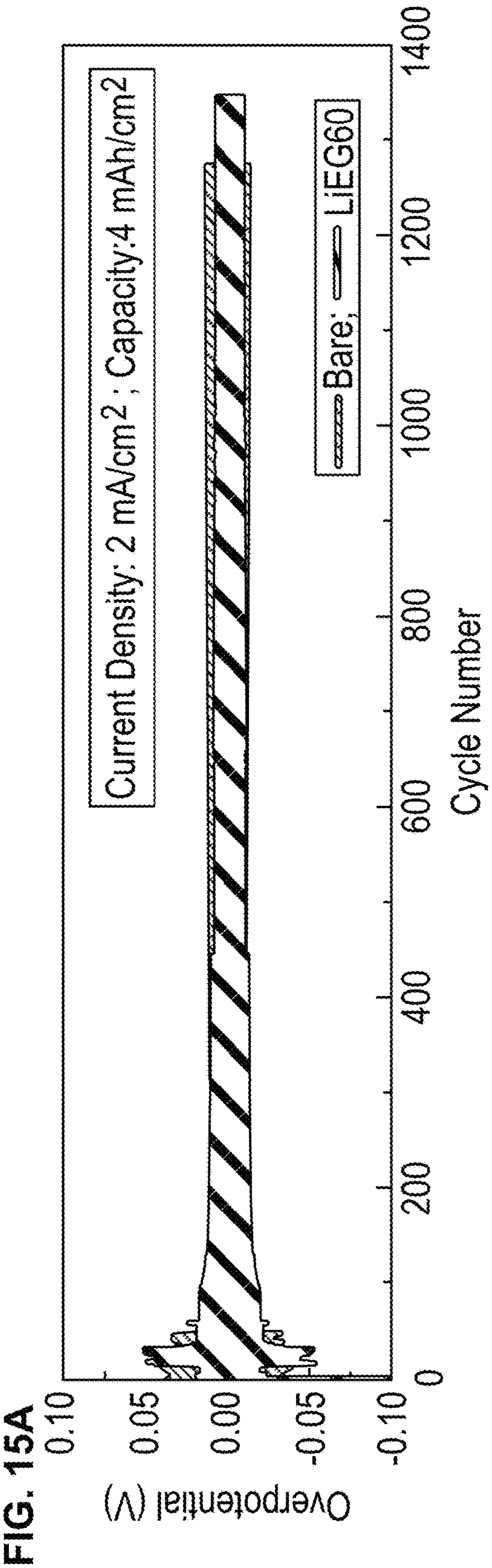
FIG. 15B
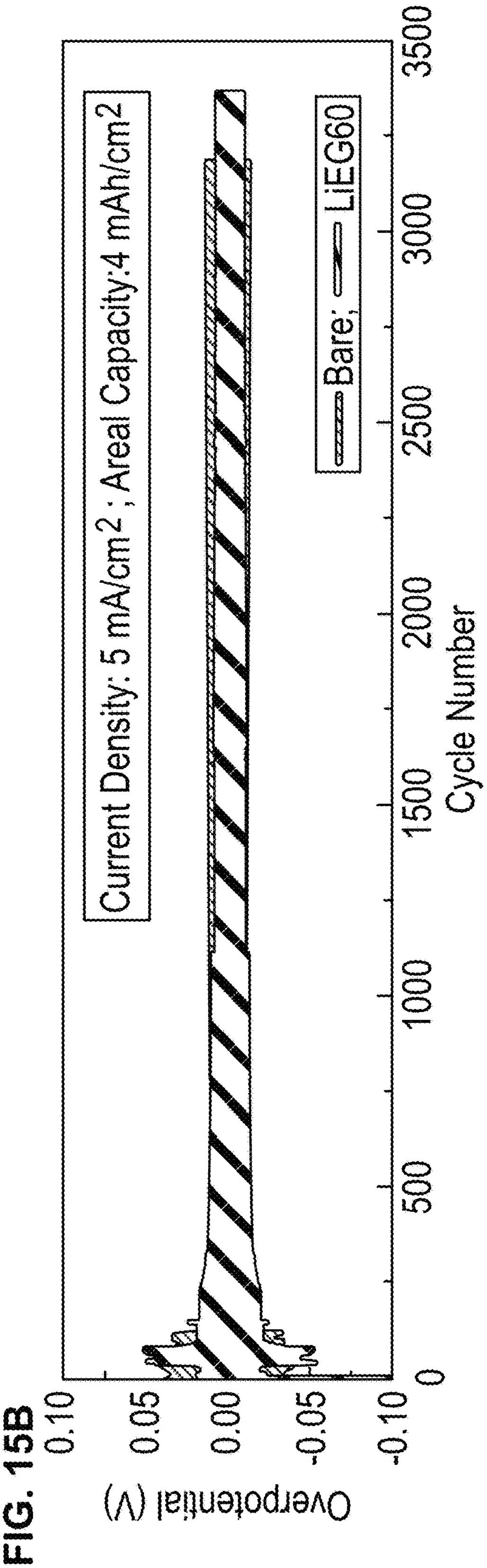
FIG. 15

FIG. 16C
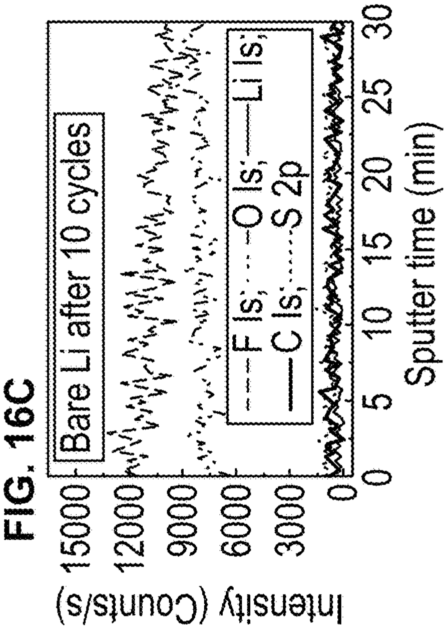
FIG. 16D
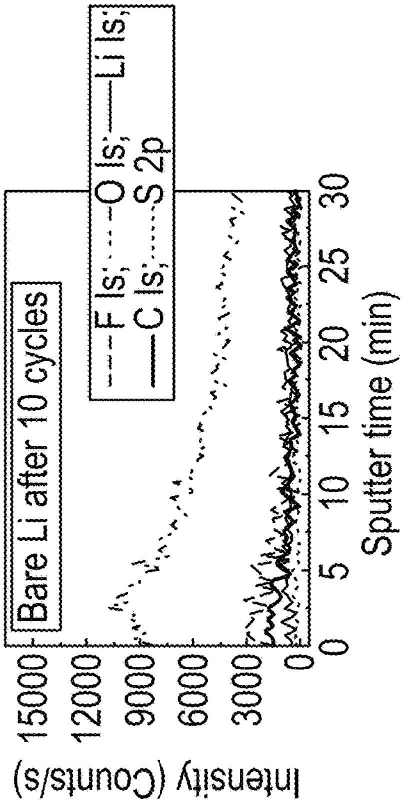
FIG. 16E
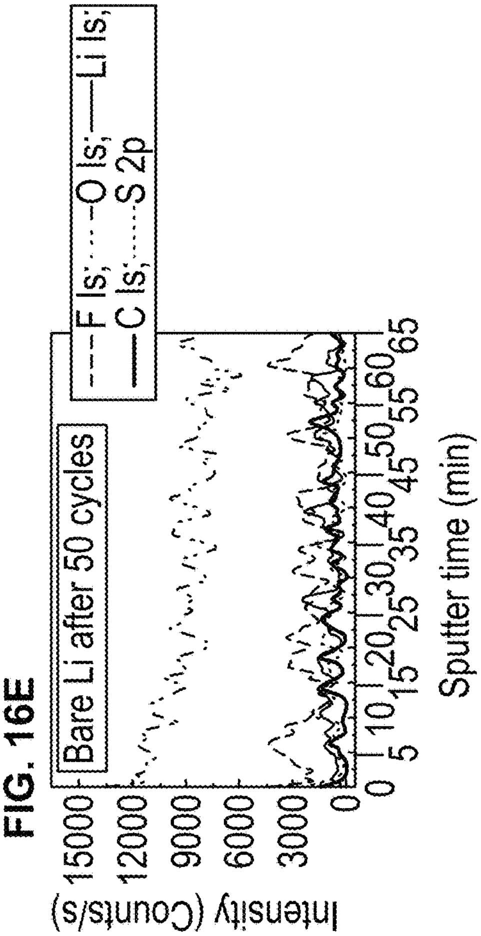
FIG. 16 CONTINUED

SUPERIOR LITHIUM METAL ANODES BY ATOMIC AND MOLECULAR LAYER DEPOSITION

RELATED APPLICATIONS

This application claims priority to U.S. Provisional Application No. 63/141,937, filed on Jan. 26, 2021, which is incorporated herein in its entirety.

STATEMENT REGARDING FEDERALLY SPONSORED RESEARCH & DEVELOPMENT

This invention was made with government support by the National Science Foundation Grant No. OIA-1457888. The government has certain rights in the invention.

INCORPORATION BY REFERENCE OF MATERIAL SUBMITTED ON A COMPACT DISC

Not applicable.

BACKGROUND OF THE INVENTION

Lithium metal (Li) can serve as anodes to couple with nearly any materials to constitute a large variety of lithium metal batteries (LMBs) such as lithium-sulfur (Li—S) and lithium-oxygen (Li—$O_2$) batteries. As shown in FIG. 1, lithium metal battery cell 100 typically consists of an Li metal anode 110, a cathode 120, an electrolyte 130, a separator 160 and two current collectors 140 and 150. The current collector 140 for Li anodes is typically a copper foil (Cu) and the current collector 150 for cathodes is typically an aluminum foil (Al). The electrolyte can be solid or liquid 130. FIG. 1 illustrates the discharge (FIG. 1*a*) and charge process (FIG. 1*b*) of a lithium metal battery cell. These LMBs have great potential to electrify our future transportation. Lithium anodes are essential for these LMBs, due to its extremely high lithium-storage capacity of 3860 mAh/g at room temperature and the lowest negative electrochemical potential (−3.04 V versus the standard hydrogen electrode). However, lithium anodes suffer from two forbidden issues, i.e., the continuous formation of solid electrolyte interphase (SEI) and lithium dendrite growth, as illustrated in FIG. 2. An Li chip is initially smooth (FIG. 2*a*) but becomes bumpy after the assembling press in a battery cell (FIG. 2*b*). At the same time, the Li chip surface has been formed with an SEI layer 210, due to its contact and reaction with the liquid electrolyte (FIG. 2*b*). The surface bumps of the Li chip are prone to take the priority to start an Li-stripping (discharge process) earlier (FIG. 2*c*). With the depletion of the Li bumps, the surrounding areas become new bumps and take the priority to continue the stripping while the former bumps become craters covered a layer of SEI and some residuals of SEI from the depleted bumps (FIG. 2*d*). Thus, there are more SEI produced during the stripping and the Li chip surface is not even in composition and morphology after the stripping (FIG. 2*e*). Due to the uneven surface property of the Li chip surface, the Li deposition in a subsequent plating (charge process) is not uniform. Some areas of the Li chip surface are deposited with more Li and the deposited Li is prone to form dendritic structures 220 (FIG. 2*f*). The formed Li dendritic structures further aggravate the uneven properties of the Li chip surface and exacerbate the formation of the SEI layer 230 on the top of the Li chip in the following stripping (FIG. 2*g*). Some SEI residuals and dead Li may be isolated and dispersed in the electrolyte. After multiple cycles of such Li-stripping/plating process, the Li chip is significantly corroded and covered with a considerably thick SEI layer 240 (FIG. 2*h*). At the same time, there is a significant consumption of Li and electrolyte. Eventually, the cell may be dried and have a significant increase of cell impedance and cell overpotential.

Limitations of State-of-the-Art Lithium-Ion Batteries

Transportation electrification represents a promising solution to the aggravating depletion of fossil fuels, given the fact that currently, transportation is consuming around 30% of the total energy in the United States while over 90% are from petroleum. Transportation electrification requires a battery technology to meet the following requirements: a high energy density of >300 Wh/kg to meet a driving range of >300 miles, affordable cost (<$125/kWh), reliable safety free of fires and explosions, and long lifetime of >15 calendar years. Among all the commercialized rechargeable battery systems, lithium-ion batteries (LIBs) represent the best technology to date, and they are dominating portable electronics. Unfortunately, state-of-the-art LIBs are still unsatisfactory in all these aspects for transportation electrification.

Limited energy density on cell level (<250 Wh/kg): The first commercial LIB cell was released by Sony Corporation in 1991, using graphite and $LiCoO_2$ (LCO) as the anode and cathode, respectively. The energy density of LIB cells is primarily determined by the capacities of both the anode and cathode and the potential difference between them. Graphite has a moderate capacity of 372 mAh/g theoretically. Following LCO, several other LIB cathodes also have been developed, including $LiMn_2O_4$ (LMO), $LiNi_{0.8}Co_{0.15}Al_{0.05}O_2$ (NCA), $LiNi_xMn_yCo_{1-x-y}O_2$ (NMC), and $LiFePO_4$ (LFP). All these cathodes have a limited specific capacity of <200 mAh/g and a voltage (versus $Li^+/Li$) of <4.0 V. Using graphite as anode and these metal oxides as cathodes, the resultant LIBs can realize a theoretical energy density (capacity×voltage) of <500 Wh/kg typically. However, these metal oxide cathodes typically have low conductivity and require conducting materials (e.g., carbon black) added for improved conductivity. Also considering the uses of aluminum and copper foil as current collectors, the energy density on cell level is typically <250 Wh/kg.

The high cost (>$150/kWh): The goal of most auto manufacturers and the US Department of Energy (DOE) is $125/kWh for a battery pack. The battery use of LCO is the largest at 45 kilotons (KT) of material, followed by NMC at 35 KT, LMO at 18 KT, LFP at 10 KT, and NCA at about 9 KT. In the past decades, the cost of LIBs has dropped evidently from $3,000/kWh in 1991 to $500/kWh in 2015. This progress has made LIBs a dominant place in portable electronic. Currently, the LIB pack price has reached $156/kWh. However, it is particularly challenging to realize the goal of $125/kWh.

Unreliable safety (fires and explosions): Safety issues have been plaguing LIBs in applications and they are among the top considerations. There have been accidents reported for LIBs used in portable electronics and electric vehicles (EVs). Safety risks identified are caused by the failure of individual components (anode, cathode, electrolyte, or current collector) and the whole system of LIB cells in some abuse conditions, such as overcharge, thermal runaway, dendritic lithium growth, dissolution of the current collector, gas evolution, and so on. Among these safety concerns, liquid organic electrolytes take a key role, given their highly flammable nature. Electrolytes are prone to decompose upon contact with anodes and cathodes to form a layer of SEI. The formation of SEI consumes Li and electrolytes and increases cell impedance.

Limited lifetime (<8 years): Performance degradation of LIBs is unavoidable and ultimately rooted in chemical processes in them. The LIB lifetime is related to battery components and operating conditions. On the anode side, the instability of SEI and lithium plating are the two major factors contributing to a loss of anode performance, while the cathode fading is due to partial dissolution of the active material or electrolyte solvent oxidation (leading to SEI formation). Thus, stable SEIs play an important role in determining the LIB performance and lifetime.

Promising High-Energy Lithium Metal Batteries

Given the limitations of LIBs in energy density, cost-effectiveness, safety, and lifetime, next-generation battery systems beyond lithium ions have been proposed, such as Li—S and Li—$O_2$ batteries. The former has a high theoretical gravimetric energy density of 2500 Wh/kg, low cost of potentially down to ~$70/kWh, and environmental friendliness. The latter has an even higher gravimetric energy density of >3500 Wh/kg, depending on discharge products. These two battery systems have the potentials to realize an energy density several to ten times higher than that of LIBs. They commonly adopt Li metal as their anodes. Li anodes can also couple with traditional cathodes of LIBs (e.g., LCO, LMO, NMC, NCA, and LFP) to establish new LMBs. Thus, Li—S and Li—$O_2$ batteries as well as any battery systems using Li metal as anodes are generally called LMBs, featuring their potentials for much higher energy densities over that of LIBs. The primary reasons lie in the lowest negative electrochemical potential of Li anodes (−3.04 V versus the standard hydrogen electrode) and the extremely high capacity of Li anodes, 3860 mAh/g, accounting for a capacity 10 times higher than that of graphite anodes in LIBs.

Existing Issues and Potential Solutions to Li Anodes

The issues of Li anodes lie in two main aspects: (i) non-uniform and unstable SEI and (ii) Li dendritic growth as shown in FIG. 2. Li metal is highly reactive to liquid organic electrolytes, leading to the formation of an SEI layer on its surface. The SEI layer is ionically conducting but electrically insulating. Also, the SEI layer is mechanically fragile and mosaic in composition. During Li plating, the huge volume expansion of Li anodes can rupture the fragile and mosaic SEI layer, promoting a preferential Li deposition through the cracks with the production of Li dendrite growth. During Li stripping, volume contraction further fractures the SEI layer, while stripping from kinks in a dendrite or from its roots can break the electrical contact and produce "dead" Li that is electrically isolated from the substrate. After continuous Li plating/stripping cycles, the repeated process can produce a porous Li anode consisting of a thick accumulated SEI layer and excessive dead Li, leading to blocked ion transport and capacity fading. Also, Li dendrites can potentially penetrate the separator and lead to internal short circuits, posing serious safety hazards. Thus, Li anodes are mainly harassed by the unstable SEI layer and the Li dendrite growth. To address these issues associated with Li anodes, four technical strategies have been developed: (i) electrolyte additives, (ii) solid-state electrolytes, (iii) surface modifications, and (iv) 3D Li-hosting frameworks. However, progress to date has been insufficient for commercialization and new efforts are urgently needed.

BRIEF SUMMARY OF THE INVENTION

In one embodiment, the present invention provides lithium-containing polymeric films and superionic inorganic lithium-conductors for protecting lithium metal electrodes. The protected lithium metal electrodes have little to no formation of SEI and dendrite growth. To achieve better protection, the embodiments of the present invention offer technical strategies for developing inorganic-organic hybrid films by combining ALD and MLD. The hybrid films enable improved mechanical properties, exceptional ionic conductivity, and excellent chemical stability in liquid electrolytes.

In other embodiments, the present prevention provides a battery comprising of at least one Li electrode, the Li electrode coated with a lithium-containing polymeric film.

In other embodiments, the present prevention provides a battery comprising of at least one Li electrode, the Li electrode coated with a lithium-containing polymeric film wherein the Li-containing polymer film is LiEG (EG=ethylene glycol).

In other embodiments, the present prevention provides a battery comprising of at least one Li electrode, the Li electrode coated with a lithium-containing polymeric film wherein the Li-containing polymer film is LiHQ (HQ=hydroquinone).

In other embodiments, the present prevention provides a battery comprising of at least one Li electrode, the Li electrode coated with a lithium-containing polymeric film wherein the Li-containing polymer film is or LiGL (GL=glycerol).

In other embodiments, the present prevention provides a battery comprising of at least one Li electrode, the Li electrode coated with a lithium-containing polymeric film wherein the Li-containing polymer film is from the group consisting of LiEG (EG=ethylene glycol), LiHQ (HQ=hydroquinone), or LiGL (GL=glycerol) and combinations thereof.

In other embodiments, the present prevention provides a battery comprising of at least one Li electrode, the Li electrode coated with a superionic inorganic lithium-conductor.

In other embodiments, the present prevention provides a battery comprising of at least one Li electrode, the Li electrode coated with a $Li_xAl_yS$ film.

In other embodiments, the present prevention provides a battery comprising of at least one Li electrode, the Li electrode coated with a plurality of superionic inorganic lithium-conductors.

In other embodiments, the present prevention provides a battery comprising of at least one Li electrode, the Li electrode coated with $Li_xAl_yS$ films having different ionic conductivities at room temperature (RT).

In other embodiments, the present prevention provides a battery comprising of at least one Li electrode, the Li electrode coated with superionic inorganic lithium-conductors having an ionic conductivity of 1.66×10-3 S/cm when the sub-cycle ratio m/n is 1:4.

In other embodiments, the present prevention provides a battery comprising at least one Li electrode, the Li electrode coated with a lithium-containing polymeric film and a superionic inorganic lithium-conductor. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 2A illustrates an Li metal chip.

FIG. 2B illustrates the Li anode in an assembled cell, presenting bumpy surface covered by a layer of SEI.

FIG. 2C illustrates the occurrence of Li stripping (discharge process) starting first from bumpy sites.

FIG. 2D illustrates new occurrence of Li stripping from new bumpy sites once the old bumpy sites deplete and thereby are covered with some residuals of SEI.

FIG. 2E illustrates considerable formation of SEI over the Li anode after the first Li stripping, with the cost of consumption of the electrolyte and Li.

FIG. 2F illustrates Li dendrites formed during the subsequent Li plating (charge process), which are covered by an SEI layer.

FIG. 2G illustrates a much thicker SEI layer formed on Li surface after the second stripping, with the cost of much more consumption of the electrolyte and Li.

FIG. 2H illustrates remarkable accumulation of SEI layers over the significantly corroded Li anode after multiple Li stripping/platting cycles.

FIG. 3A illustrates how ALD enables inorganic materials to grow in a layer-by-layer manner at the atomic level.

FIG. 3B illustrates how MLD enables polymeric films to grow in a layer-by-layer manner at the molecular level.

FIG. 4, which includes FIG. 4A shows the proposed general MLD strategy for growing lithium-containing polymeric films and the proposed growth mechanisms.

FIG. 4, which includes FIG. 4B shows the MLD growth mechanism of LiEG.

FIG. 4, which includes FIG. 4C shows the MLD growth mechanism of LiHQ.

FIG. 4, which includes FIG. 4D shows the MLD growth mechanism of LiGL.

FIG. 5A shows the quartz crystal microbalance (QCM) measurement of the 200-cycle ALD $Al_2O_3$ grown on the crystal of QCM. The ALD $Al_2O_3$ growth presents a linear growth behavior, and the resultant film serves as the starting surface for QCM measurements of the growth of MLD polymeric films.

FIG. 5B shows the QCM measurement of the 100-cycle MLD LiGL growth on the pre-deposited ALD $Al_2O_3$ film, presenting a nearly linear growth.

FIG. 5C shows the enlarged view on the very beginning growth of the MLD LiGL in a few cycles on the pre-deposited ALD $Al_2O_3$ film.

FIG. 5D shows the enlarged view on the stable growth of MLD LiGL in three consecutive cycles.

FIG. 7A shows the QCM measurement of the 30-cycle MLD LiEG growth on the pre-deposited ALD $Al_2O_3$ film, presenting a nearly linear growth.

FIG. 7B shows the enlarged view on the stable growth of the MLD LiEG in a few cycles on the pre-deposited ALD $Al_2O_3$ film.

FIG. 7C shows the QCM measurement of the 20-cycle MLD LiHQ growth on the pre-deposited ALD $Al_2O_3$ film, presenting a nearly linear growth.

FIG. 7D shows the enlarged view on the stable growth of the MLD LiHQ in a few cycles on the pre-deposited ALD $Al_2O_3$ film.

FIG. 8, which includes FIG. 8A schematically illustrates one stripping for the right Li electrode (or one plating for the left Li electrode) in a Li/Li symmetric cell.

FIG. 8, which includes FIG. 8B schematically illustrates one subsequent plating for the right Li electrode (or one subsequent stripping for the left Li electrode) in a Li/Li symmetric cell.

FIG. 9A illustrates an Li chip 910 uniformly covered with a coating 920 via an ALD or/and MLD process.

FIG. 9B illustrates that the assembled Li chip 911 becomes bumpy and that there are some fractures formed within the coating layer 920. The fractures are covered by some SEI 930.

FIG. 9C illustrates that Li stripping first starts from bumpy sites.

FIG. 9D illustrates that the bumpy coating layer 920 is flattened due to the Li stripping and the flattened coating helps produce uniform Li-stripping.

FIG. 9E illustrates that the coating layer 920 helps form uniform Li-plating and its exceptional ionic conductivity enables uniform Li deposition under the coating layer with little SEI and dendritic formation.

FIG. 12 illustrates the effects of the 60-cycle MLD-LiGL coating on the stability of the symmetric Li/Li cells, compared to bare Li/Li cells in a carbonate electrolyte. The results show that the LiGL60 symmetric cell has a much better stability. The carbonate electrolyte is 1.2 M LiPF6 in 3:7 EC:EMC and controlled for 20 μL. The testing current density is 2 $mA/cm^2$ and the testing capacity is 1 $mAh/cm^2$.

FIG. 13, which includes FIG. 13A illustrates the effects of the LiGL coatings on the stability of symmetric Li/Li cells due to different MLD cycles, compared to bare Li/Li cells in an ether electrolyte. The MLD-LiGL films were coated on both Li electrodes of the Li/Li symmetric cells for different MLD cycles: 10, 15, 20, 45, and 90. The resultant LiGL-coated Li/Li symmetric cells were then named as LiGL10, LiGL15, LiGL20, LiGL45, and LiGL90, respectively. The results clearly show that, under current density of 2 $mA/cm^2$ and an areal capacity of 1 $mAh/cm^2$, an MLD-LiGL coating thicker than 15-cycle MLD-LiGL is preferred and the thicker the lower of the overpotential of the MLD-coated Li/Li cells. The LiGL45 Li/Li cell has achieved the highest record of over 10,000 Li-stripping/plating cycles (over 10,000 testing hours). The ether electrolyte is 1 M LITFSI in 1:1 DOL:DME and controlled for 20 μL.

FIG. 13, which includes FIG. 13B illustrates the effects of the LiGL coatings on the stability of symmetric Li/Li cells due to different MLD cycles, compared to bare Li/Li cells in an ether electrolyte. The MLD-LiGL films were coated on both Li electrodes of the Li/Li symmetric cells for different MLD cycles: 15, 20, and 60. The resultant LiGL-coated Li/Li symmetric cells were then named as LiGL15, LiGL20, and LiGL60, respectively. The results clearly show that, under current density of 5 $mA/cm^2$ and an areal capacity of 1 $mAh/cm^2$, an MLD-LiGL coating thicker than 20-cycle MLD-LiGL is preferred and the thicker the lower of the overpotential of the MLD-coated Li/Li cells. The LiGL60 Li/Li cell has achieved the highest record of over 20,000 Li-stripping/plating cycles (over 8,000 testing hours). The ether electrolyte is 1 M LITFSI in 1:1 DOL:DME and controlled for 20 μL.

FIG. 13, which includes FIG. 13C illustrates the effects of the LiGL coatings on the stability of symmetric Li/Li cells due to different MLD cycles, compared to bare Li/Li cells in an ether electrolyte. The MLD-LiGL films were coated on both Li electrodes of the Li/Li symmetric cells for 100 MLD cycles. The resultant LiGL-coated Li/Li symmetric cells were then named as LiGL100. The results clearly show that, under current density of 7.5 $mA/cm^2$ and an areal capacity of 1 $mAh/cm^2$, the LiGL100 Li/Li cell has achieved the highest record of over 10,000 Li-stripping/plating cycles (over 2,600 testing hours). The ether electrolyte is 1 M LITFSI in 1:1 DOL:DME and controlled for 20 μL.

FIG. 15, which includes FIG. 15A illustrates the comparison of bare Li/Li and LiGL60 symmetric cells in an ether electrolyte, under a current density of 2 $mA/cm^2$ and an areal capacity of 4 $mAh/cm^2$. The results show that the LiGL60 symmetric cell enables a lower stable overpotential. The ether electrolyte is 1 M LITFSI in 1:1 DOL:DME and controlled for 20 μL.

FIG. 15, which includes FIG. 15B illustrates the comparison of bare Li/Li and LiGL60 symmetric cells in an ether electrolyte, under a current density of 5 $mA/cm^2$ and an areal capacity of 4 $mAh/cm^2$. The results show that the LiGL60 symmetric cell enables a lower stable overpotential. The ether electrolyte is 1 M LITFSI in 1:1 DOL:DME and controlled for 20 μL.

FIG. 16C shows the XPS depth profiling on bare Li electrode after 10 Li-stripping/plating cycles.

FIG. 16D shows the XPS depth profiling on LiGL90 electrode after 10 Li-stripping/plating cycles.

FIG. 16E shows the XPS depth profiling on LiGL90 electrode after 50 Li-stripping/plating cycles.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

Principles Behind ALD and MLD

Figures 1, 1A, 1B:
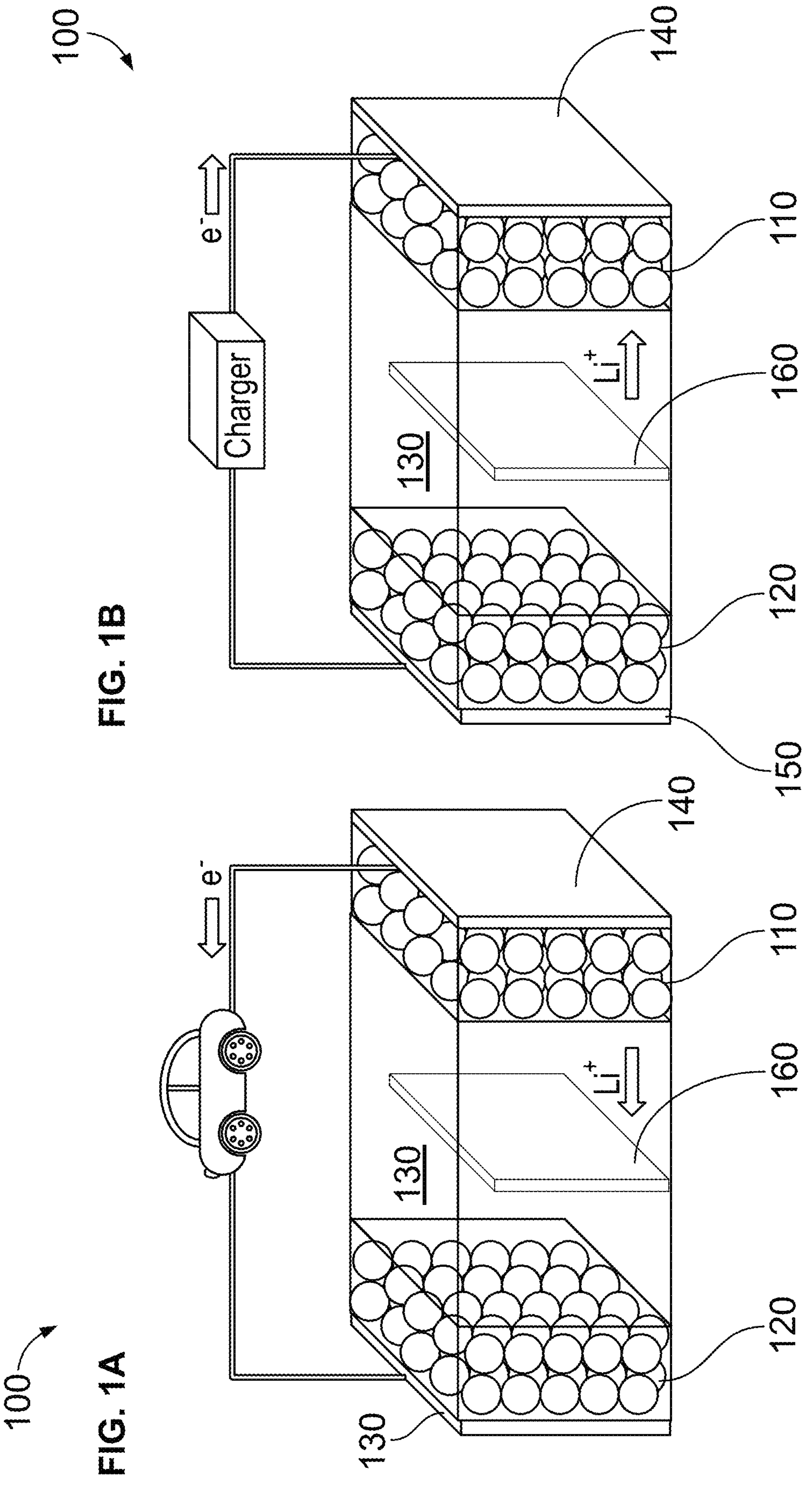
FIG. 1, which includes
FIG. 1A illustrates an LMB cell during a discharge process, consisting of an Li metal anode, a cathode, a liquid organic electrolyte, a current collector for the Li anode, and a current collector for the cathode.
FIG. 1B illustrates an LMB cell during a charge process.
Figure 2:
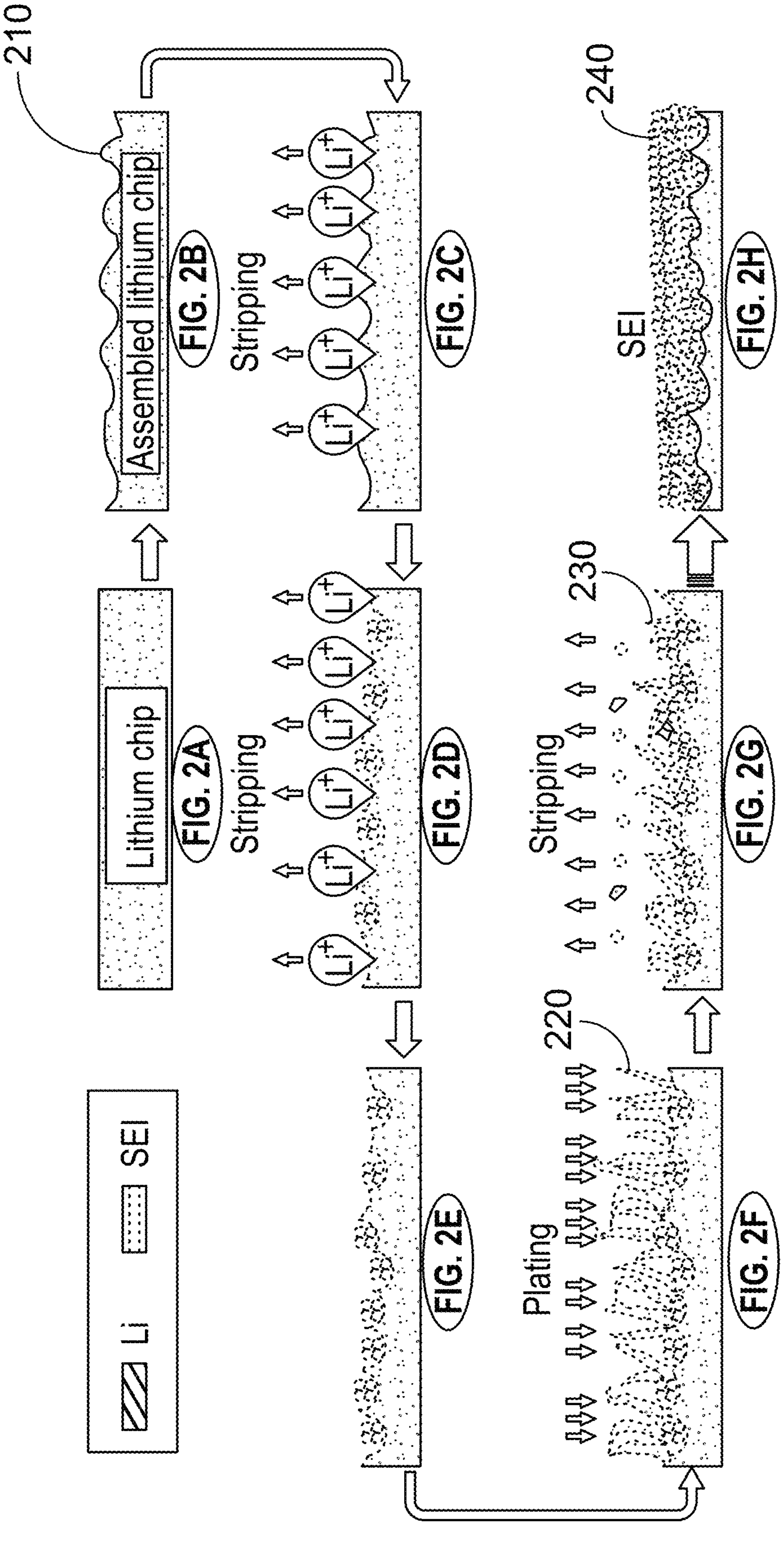
FIG. 2, which includes
Figure 3:
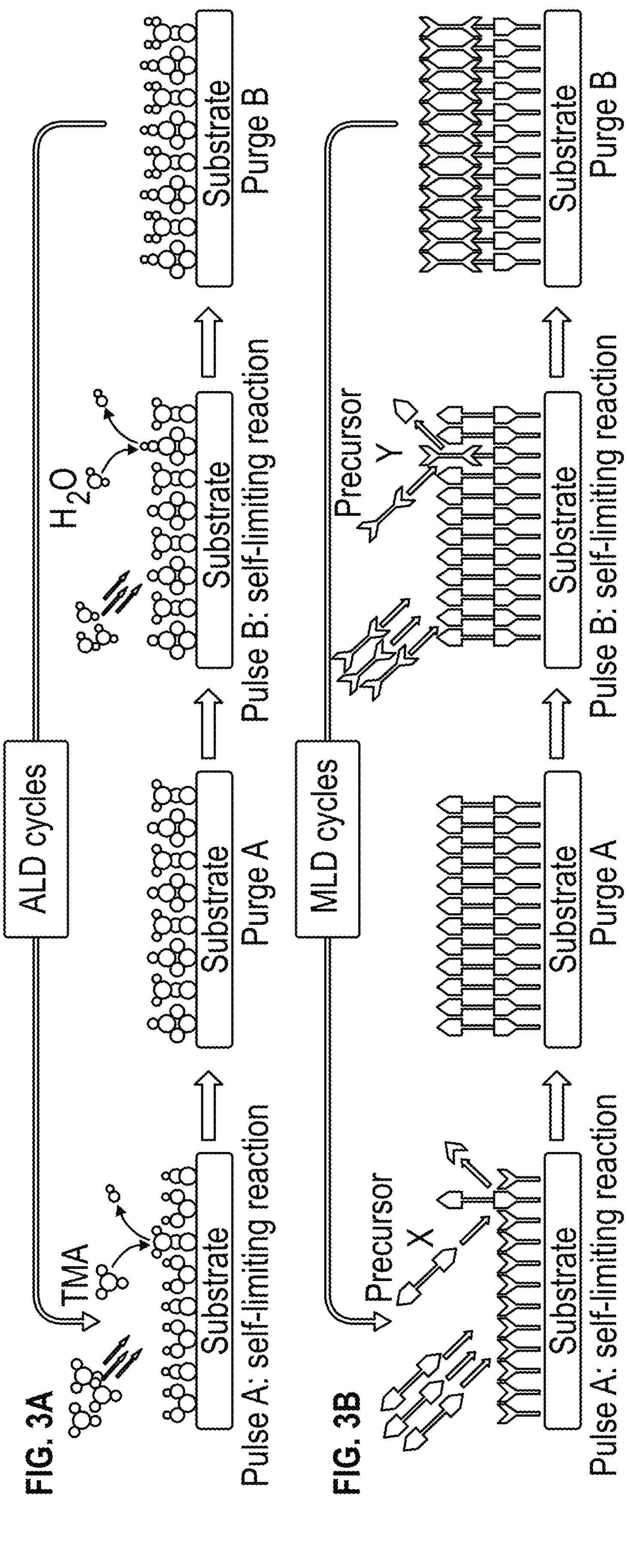
FIG. 3, which includes

The embodiments of the invention may use the techniques of atomic and molecular layer deposition (ALD and MLD). ALD and MLD are two analogous vapor-phase thin-film techniques. Adopting different precursors, ALD exclusively enables the growth of inorganic materials at the atomic level while MLD enables the growth of pure or hybrid polymers at the molecular level. Thus, these two techniques are highly complementary. ALD and MLD both proceed with material growth through alternating gas-solid surface reactions as shown in FIG. 3.

To exemplify the unique mechanism of ALD, the model process of $Al_2O_3$ using trimethylaluminum (TMA) and water as precursors is illustrate in FIG. 3*a*. Two surface reactions are caused by TMA and water, respectively. After each of the two surface reactions, a purge is applied to avoid any direct reactions between TMA and water. The sequence of reaction/purge/reaction/purge constitutes an ALD cycle. With increased cycles, ALD builds up films on a substrate surface with a precisely controlled growth per cycle (GPC), typically 1 Å/cycle. Similarly, as illustrated in FIG. 3*b* using two homobifunctional organic precursors X and Y, MLD enables a GPC of typically a few angstroms per cycle. Due to their surface-controlled nature during deposition, ALD and MLD both can generate extremely uniform films with low roughness and coat high-aspect-ratio (HAR) structures conformally. For example, ALD has enabled uniform coatings on wafer-scale planar substrates and conformal coatings over nanoporous templates with a HAR of up to 10,000:1. Also, ALD and MLD both typically operate at low temperatures 300° C.).

Accordingly, in certain embodiments, the present invention provides protective films via ALD and MLD processes aimed at protecting Li anodes. The embodiments of the present invention concern novel Li-conducting films using ALD and MLD. The films and the ALD/MLD techniques may have the following aspects: (1). Forming a uniform and conformal coverage over any shaped Li anodes. (2). Enabling fast Li-ion transportation to Li anodes. (3). Having excellent mechanical strength to inhibit Li-dendritic growth. (4). Having exceptional elasticity and flexibility to accommodate the volume change of Li stripping and platting. (5). Being deposited on Li anodes directly at low temperatures less than 180° C. (6). Being stable in organic liquid electrolytes.

The Li-Containing Polymeric Films of the Present Invention

MLD Strategies

In certain aspects, the embodiments of the present invention concern MLD-deposited Li-containing polymeric films that improve Li-conduction as compared to existing over any MLD-deposited polymers. The Li-containing polymers may be LiEG (EG=ethylene glycol), LiHQ (HQ=hydroquinone), and LiGL (GL=glycerol). The MLD processes are illustrated in FIG. 4. To couple with these organic precursors (i.e., EG, HQ and GL), lithium tert-butoxide ($LiO^tBu$ or LTB) was used as the Li precursor.

FIGS. 4*a*-4*d* provide illustrations of preferred embodiments of the present invention using MLD to grow Li-containing polymers of LiEG (EG=ethylene glycol), LiHQ (HQ=hydroquinone), and LiGL (GL=glycerol) through coupling lithium tert-butoxide (LTB, $LiO^tBu$) with EG, HQ or GL. (a).

The general MLD strategy for lithium-containing films and the proposed growth mechanisms of (b) MLD LiEG, (c) MLD LiHQ and (d) MLD LiGL.

Strategy Verifications Via QCM Measurements

Figure 5:
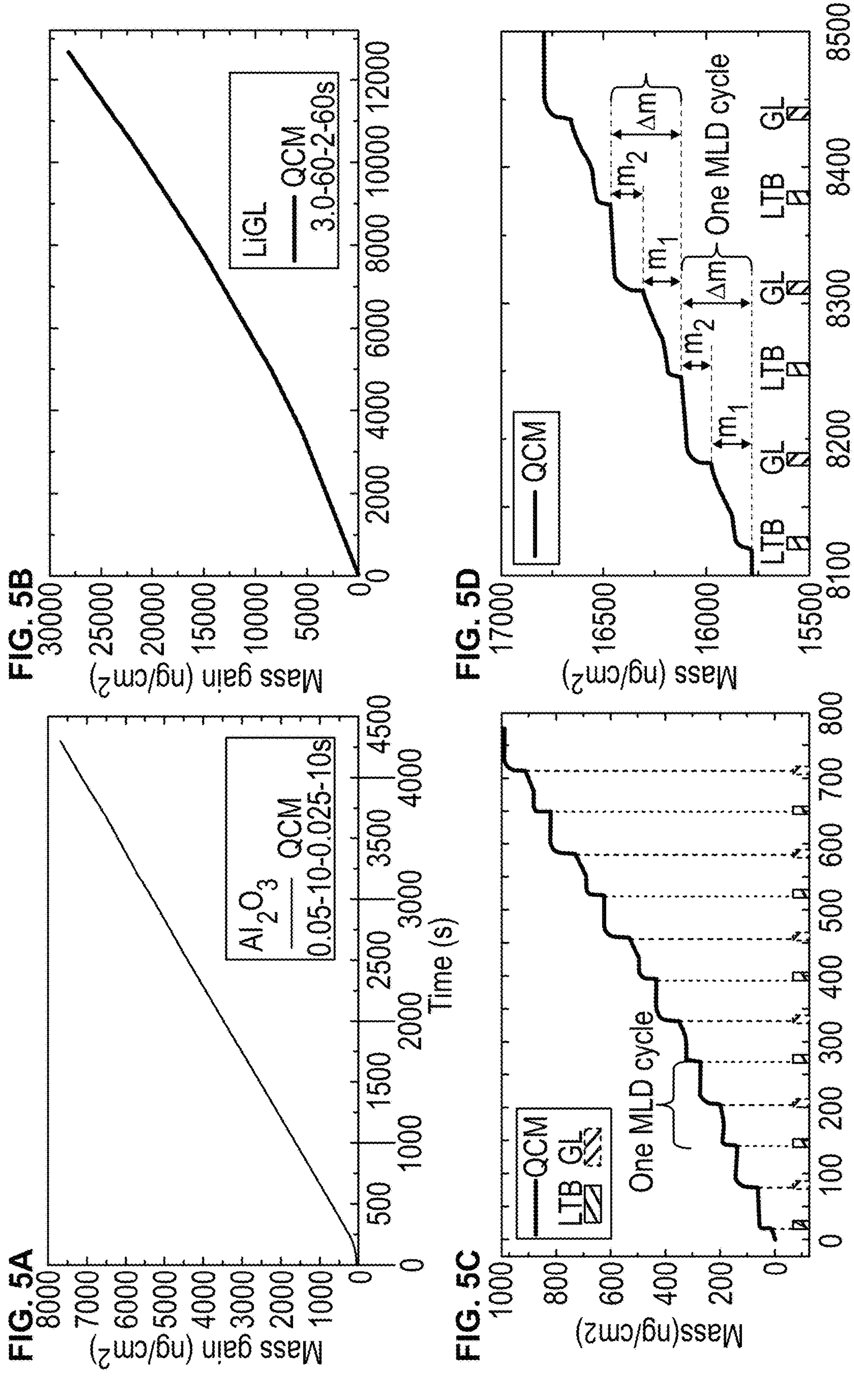
FIG. 5, which includes
Figure 7:
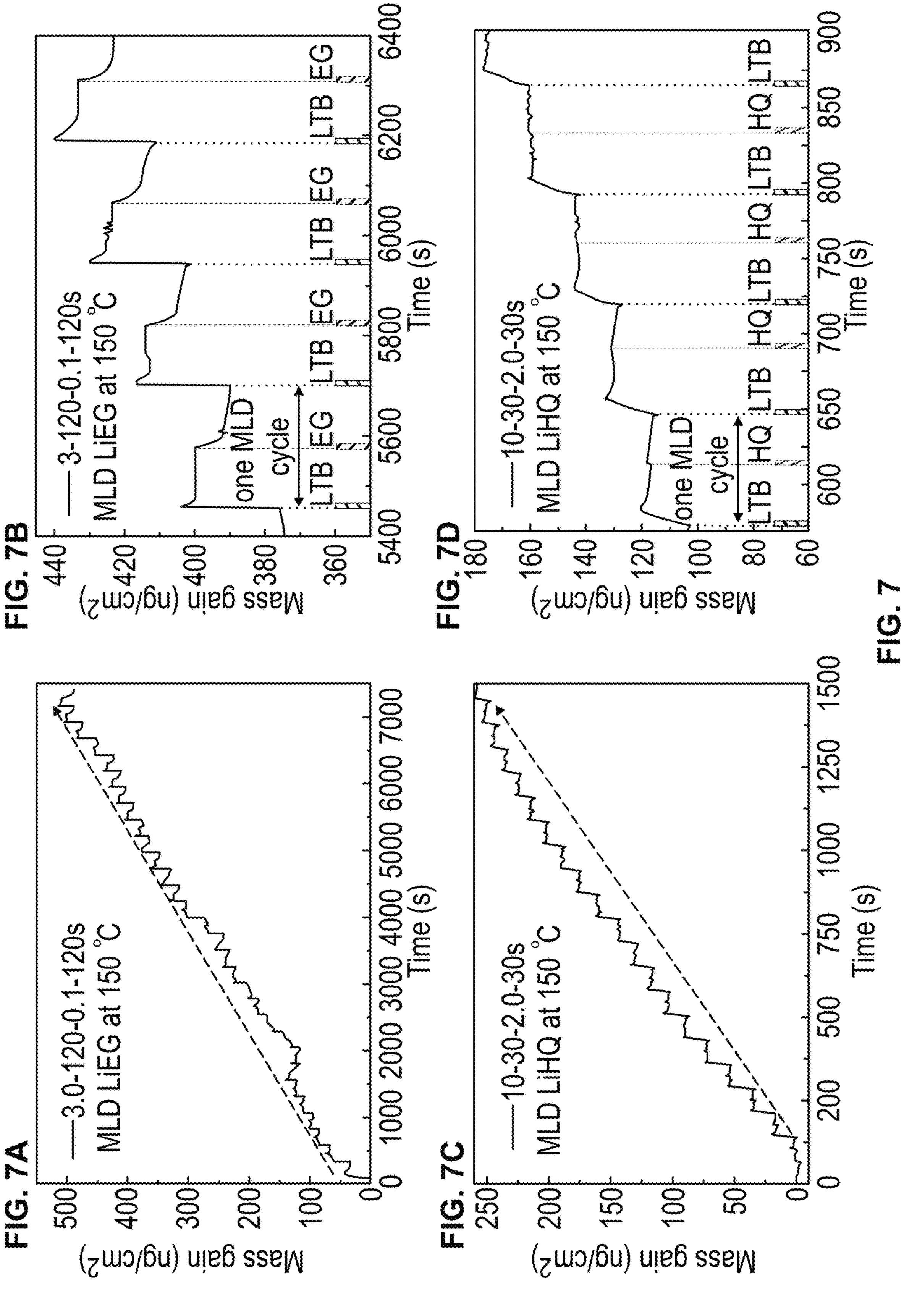
FIG. 7, which includes

To verify the feasibility of the proposed MLD processes, quartz crystal microbalance (QCM) was used to measure the growth of LiEG (FIG. 7(*a,b*)), LiHQ (FIG. 7(*c,d*)), and LiGL (FIG. 5(*b-d*)).

The MLD LiEG was operated at 150° C. with the time sequence of 3-120-0.1-120 s (LTB dose-purge-EG dose-purge). The LTB precursor was heated at 150° C. and EG was maintained at 50° C. during the MLD operation. It is found that the growth rate of LiEG is 17.5 ng/$cm^2$, as illustrated in FIGS. 7*a* and 7*b*.

The MLD LiHQ was operated at 150° C. with a time sequence of 10-30-2-30 s (LTB dose-purge-HQ dose-purge). Both the LTB and HQ precursors were maintained at 150° C. during the MLD process. When changing the dose time of HQ from 0.5 s to 2 s, the growth rate increase from 6.06 to 12.04 ng/$cm^2$, as illustrated in FIGS. 7*c* and 7*d*. However, when the dose time of HQ is increased to 3 s, the growth rate dropped dramatically. At the same time, it was found that the vapor pressure of HQ nearly vanished, even lower than the vapor using 0.5-s dose. This may be attributed to the evolution of HQ under a such high temperature of 150° C.

The MLD LiGL was operated at 150° C. with a time sequence of 3.0-60-2.0-60 s (LTB dose-purge-GL dose-purge). The LTB precursor was heated to 150° C. while GL was also maintained at 150° C. during the MLD process. The average mass gain ($\Delta m=m_1+m_2$) is ~200 ng/$cm^2$/cycle in the initiation region (~30 cycles starting on an $Al_2O_3$ film, FIG. 5(*c*)) while ~320 ng/$cm^2$/cycle in the stable growth region (FIG. 5(*d*)). The stable region exhibits a highly repeatable GPC. Compared to EG and HQ, each GL molecule has three —OH functional groups so that they will not be terminated by the surface groups at the same time. The LiGL films were deposited on one type of nitrogen-doped graphene nanosheets (N-GNS) (FIG. 6(*a*)) to determine its growth per cycle (GPC) at 150° C. The N-GNS features its high surface area and thin wrinkles of <3 nm. Observing the thickness changes of the wrinkle of the N-GNS after 20 cycles (FIG. 6*b*) of the LiGL deposition using an SEM, it was concluded that the average GPC of the MLD LiGL is ~2.7 nm/cycle, which is among the highest GPCs of all the MLD processes reported to date. In addition to the SEM images, elemental mapping was conducted on the 20-cycle LiGL-coated N-NGS using an energy dispersive X-ray spectroscopy (EDX) (FIG. 6*c*), which shows the distributions of N, C, and O. N is from N-GNS, C is from N-GNS and LiGL, and O is from LiGL. Consequently, EDX mapping revealed that the MLD LiGL coating over the N-GNS is very conformal and uniform.

The overall reaction of the MLD LiGL is as follows in Equation 1:

$$3LiO^tBu+(CH_2CHCH_2)(OH)_3\rightarrow(CH_2CHCH_2)(OLi)_3+3HO^tBu \quad (1)$$

Figures 6, 6A, 6B, 6C, 6D:
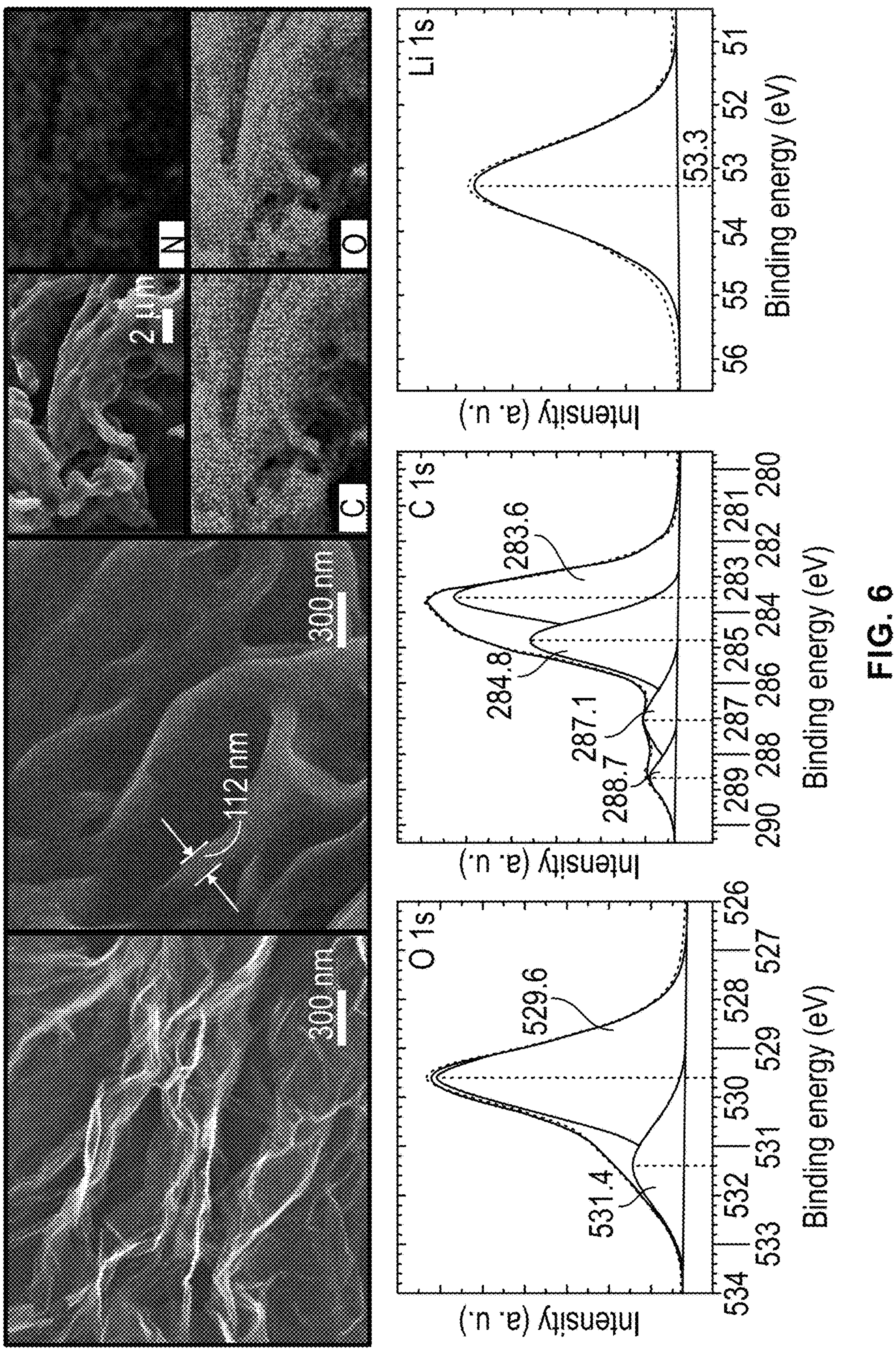
FIG. 6, which includes
FIG. 6A shows the image of pristine nitrogen-doped graphene nanosheets (N-GNS) by scanning electron microscopy (SEM)
FIG. 6B shows the SEM image of N-GNS covered by 20-MLD-cycle LiGL film.
FIG. 6C shows the elemental mapping on 20-MLD-cycle LiGL supported by N-GNS by energy dispersive X-ray spectroscopy (EDX).
FIG. 6D shows the high-resolution spectra of O1s, C1s, and Li1s by X-ray photoelectron spectroscopy (XPS).

Thus, the LiGL is supposed to have a unit structure of $(CH_2CHCH_2)(OLi)_3$ in its ideal MLD condition. XPS was employed to determine the composition of the deposited LiGL films on Si wafers. In FIG. 6*d*, the O 1s spectra show a strong peak at 529.6 eV and a weak peak at 531.4 eV, assigned to $O^{2-}$ in Li—O bonds and C—O—Li, respectively. The C 1s spectra show two evident peaks at 284.8 and 283.6 eV, which are related to C—C/C—H and Li—O—C groups, respectively. The two weak peaks at 288.7 and 287.1 eV are related to O═C—OH and C—O bonds, respectively.

The Li 1s XPS spectra shows only one peak at 53.3 eV and this should be attributed to Li—O. According to the XPS analyses, the deposited LiGL contains 31.69 at. % of Li, 28.73 at. % of C, and 39.59 at. % of O. The element contents of Li, C, and O are basically consistent to the postulation of the LiGL unit structure, $(CH_2CHCH_2)(OLi)_3$.

The MLD LiEG and LiHQ Growth were Investigated Using QCM at 150° C. as Shown in FIG. 7.

The overall reactions of the MLD LiEG and LiHQ are proposed in Equation 2 and Equation 3 as follows, respectively.

$$2LiO^tBu+(CH_2CH_2)(OH)_2\rightarrow(CH_2CH_2)(OLi)_2+2HO^tBu(g) \quad (2)$$

$$2LiO^tBu+(C_6H_4)(OH)_2\rightarrow(C_6H_4)(OLi)_2+2HO^tBu(g) \quad (3)$$

The growth temperatures of LiEG, LiHQ and LiGL are not limited to 150° C. and can be lower/higher than 150° C. In addition, the doses of the precursors (LTB, EG, HQ and GL) and purges also are adjustable and can be lower or higher times.

Effects of MLD Coatings on Electrochemical Performance of Li Anodes

To verify the beneficial effects of the MLD coatings of LiEG, LiHQ and LiGL, both LiEG and LiGL coatings on Li metal anodes in Li/Li symmetric cells (illustrated in FIG. 8) in two different electrolytes was investigated: one carbonate electrolyte is 1.2 M $LiPF_6$ in a mixture of ethylene carbonate (EC) and ethyl methyl carbonate (EMC) (EC:EMC=3:7 by weight) and one ether electrolyte is 1 M lithium bis(trifluoromethanesulfonyl) imide (LITFSI) in 1,3-dioxolane (DOL) and 1,2-dimethoxyethane (DME) (DOL:DME=1:1 by volume). A Celgard 2325 membrane was used as the separator placed between the two Li electrodes.

Figure 9:
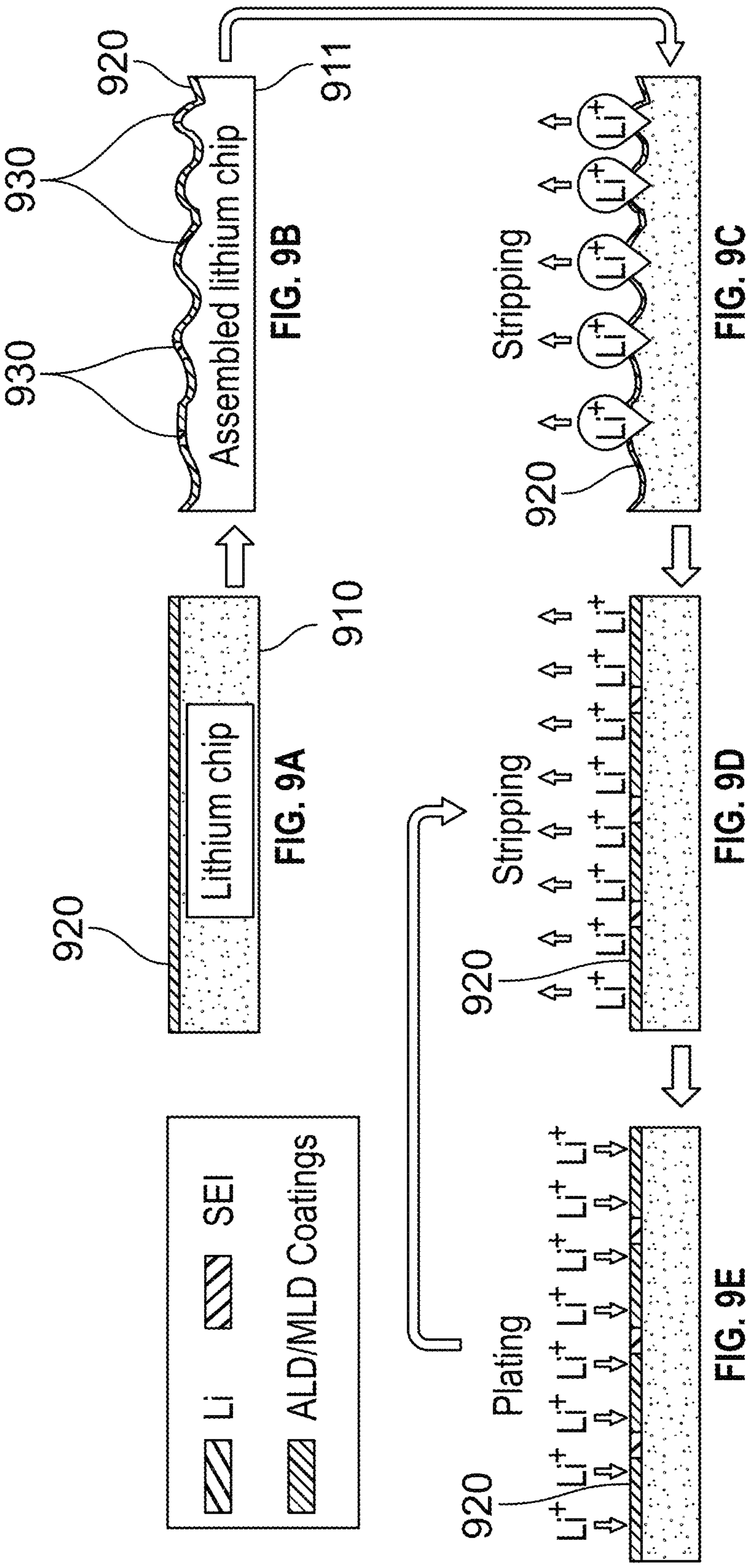
FIG. 9, which includes

The proposed protective mechanisms of the ALD/MLD coatings are illustrated in FIGS. 9(*a*)-9(*e*). FIG. 9(*a*) illustrates an Li chip 910 uniformly covered with a coating of the present invention 920 via ALD or/and MLD processes. FIG. 9(*b*) illustrates that the assembled Li chip 911 becomes bumpy and that there are some fractures formed within the coating layer. The fractures are covered by some SEI 930. FIG. 9(*c*) illustrates that Li stripping first starts from bumpy sites. FIG. 9(*d*) illustrates that the bumpy coating layer is flattened due to the Li stripping and the flattened coating helps produce uniform Li-stripping. FIG. 9(*e*) illustrates that the coating layer 920 helps form uniform Li-plating and its exceptional ionic conductivity enables uniform Li deposition under the coating layer with little SEI and dendritic formation.

Figure 10:
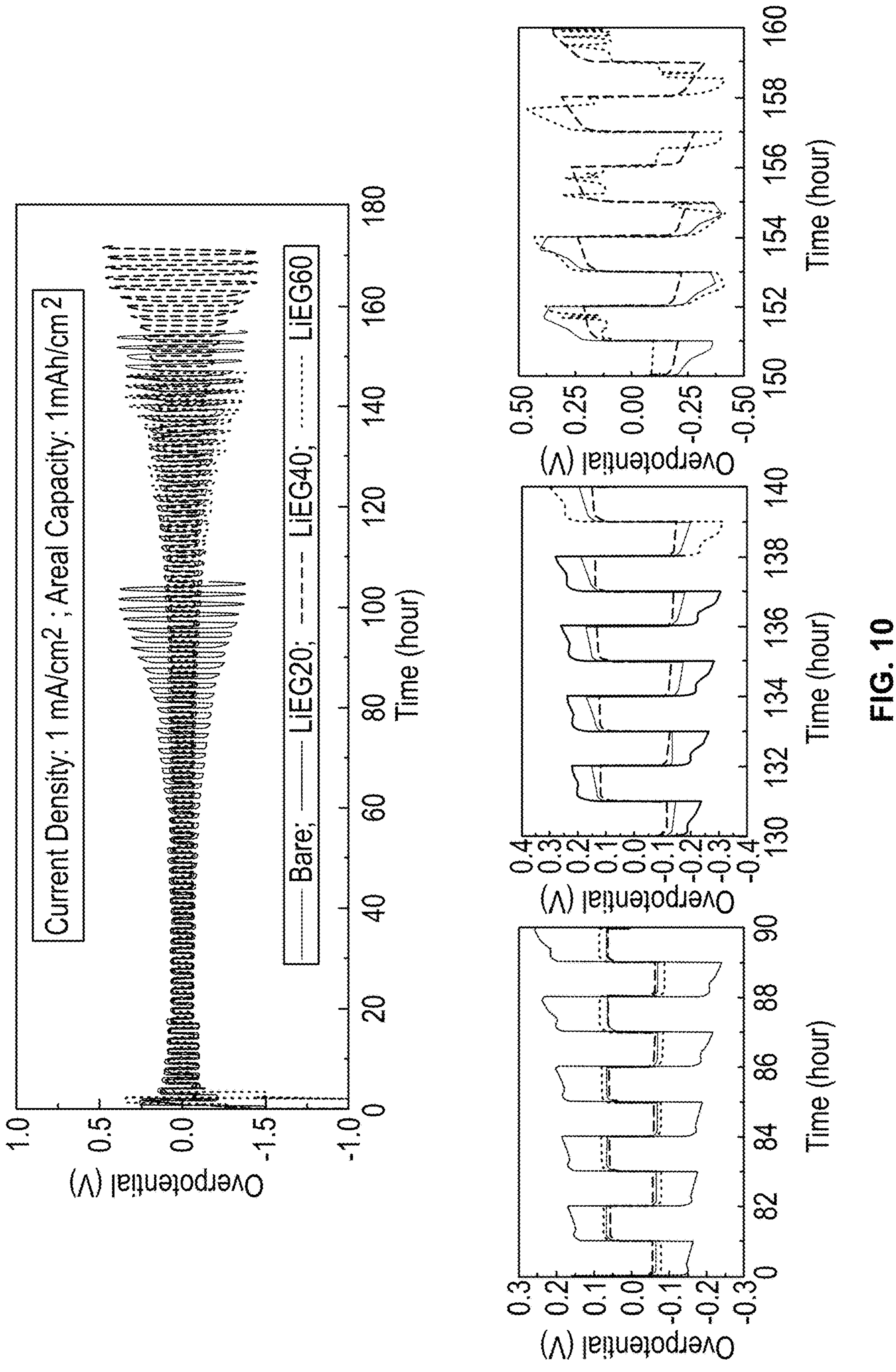
FIG. 10 illustrates the effects of LiEG coatings on the stability of the symmetric Li/Li cells due to different MLD cycles, compared to bare Li/Li cells in a carbonate electrolyte. The MLD-LiEG films were coated on both Li electrodes in Li/Li symmetric cells for different MLD cycles: 20, 40, and 60. The resultant LiEG-coated Li/Li symmetric cells were then named as LiEG20, LiEG40, and LiEG60, respectively. The results show that the LiEG40 symmetric cell has the best stability. The carbonate electrolyte is 1.2 M LiPF6 in 3:7 EC:EMC and controlled for 20 μL. The testing current density is 1 $mA/cm^2$ and the testing capacity is 1 $mAh/cm^2$.

As shown in FIG. 10 the LiEG coatings can be beneficial to sustain a longer cyclability of the coated Li/Li symmetric cells when a suitable film thickness is determined in 1.2 M $LiPF_6$ in 3:7 EC:EMC. MLD cycles were controlled to control the deposited film thickness. It is apparent that the 40-cycle MLD-LiEG (i.e., LiEG40) performs the best among the investigated film thicknesses at a current density of 1 mA/$cm^2$ and a capacity of 1 mAh/$cm^2$ and outperforms the bare Li/Li cell. During the cell cycling, the Li stripping and plating were 1 hour, respectively.

Figure 11:
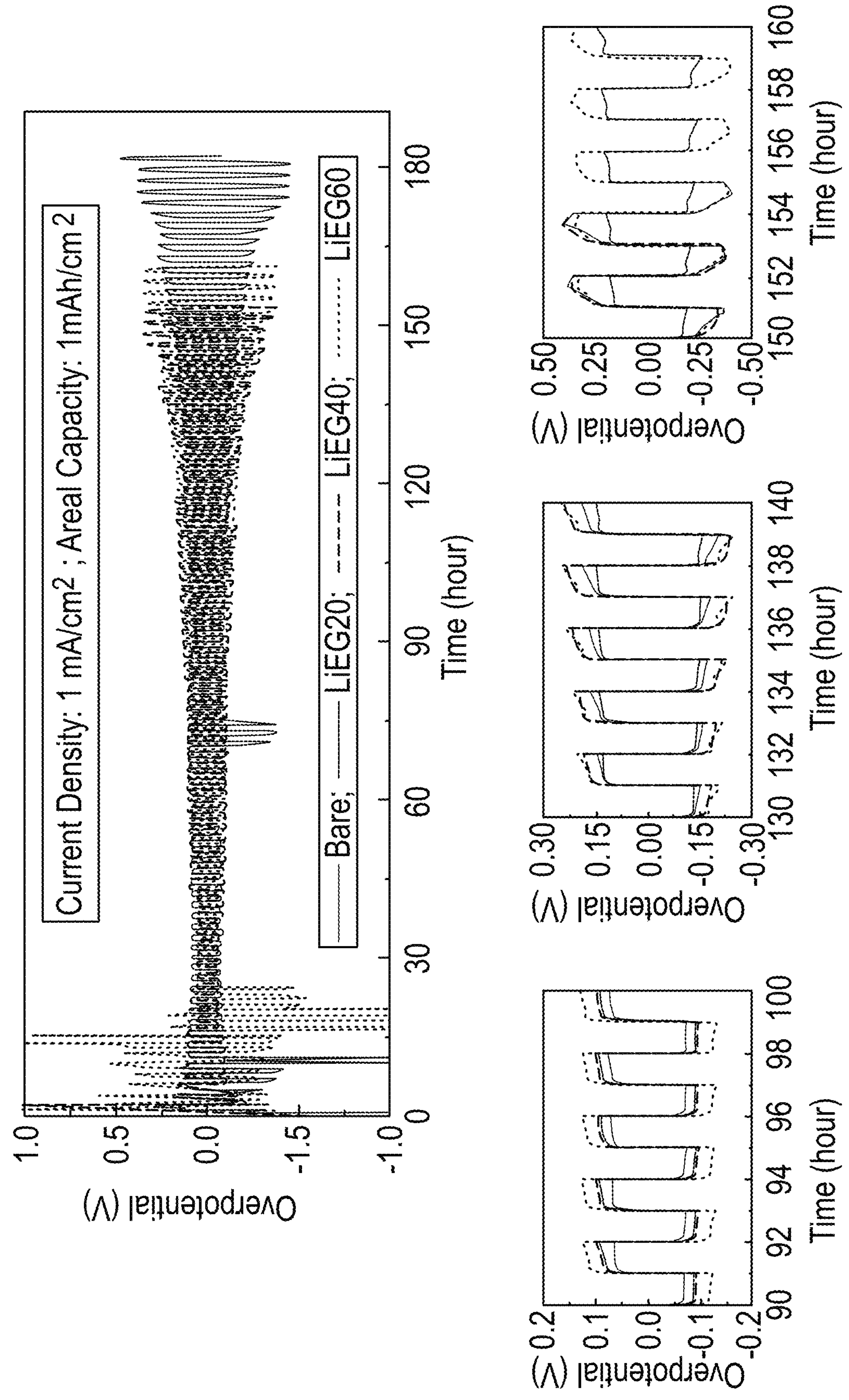
FIG. 11 illustrates the effects of the LiGL coatings on the stability of symmetric Li/Li cells due to different MLD cycles, compared to bare Li/Li cells in a carbonate electrolyte. The MLD-LiGL films were coated on both Li electrodes in Li/Li symmetric cells for different MLD cycles: 20, 40, and 60. The resultant LiEG-coated Li/Li symmetric cells were then named as LiGL20, LiGL40, and LiGL60, respectively. The results clearly show that the LiGL20 symmetric cell has the best stability. The carbonate electrolyte is 1.2 M LiPF6 in 3:7 EC:EMC and controlled for 20 μL. The testing current density is 1 $mA/cm^2$ and the testing capacity is 1 $mAh/cm^2$.

Similarly, FIG. 11 illustrates the effects of the invented MLD LiGL coatings on Li metal electrodes in 1M $LiPF_6$ in 3:7 EC:EMC. Using a current density of 1 mA/$cm^2$ and a capacity of 1 mAh/$cm^2$, among all the investigated film thicknesses of the 20-cycle MLD-LiGL (i.e., LiGL20) outperforms all the other cases in cyclability and sustains a low overpotential for the longest cycles.

As shown in FIG. 12, the effects of the 60-cycle MLD-LiGL coating on the stability of the symmetric Li/Li cells are compared to bare Li/Li cells in a carbonate electrolyte. The results show that the LiGL60 symmetric cell has a much better stability. The carbonate electrolyte is 1.2 M LiPF6 in 3:7 EC:EMC and controlled for 20 μL. The testing current density is 2 $mA/cm^2$ and the testing capacity is 1 $mAh/cm^2$.

Using a current density of 2, 5, and 7.5 $mA/cm^2$ and a capacity of 1 $mAh/cm^2$, results show that the MLD coatings performed much better in the ether electrolyte, 1 M LITFSI in 1:1 DOL:DME, as shown in FIG. 13. The results show that all the MLD-coated Li/Li cells have better stability than the bare Li/Li cell, accounting for lower overpotentials and remarkably much longer lifetimes. The results suggest that an MLD-LiGL coating thicker than 15 MLD cycles performs much better than a thinner MLD-LiGL coating in protecting Li anodes at a current density of 2 $mA/cm^2$ (FIG. 13(*a*)). With increased current densities, thicker MLD-LiGL coatings are preferred (FIG. 13(*b,c*))

Figures 14, 14A, 14B:
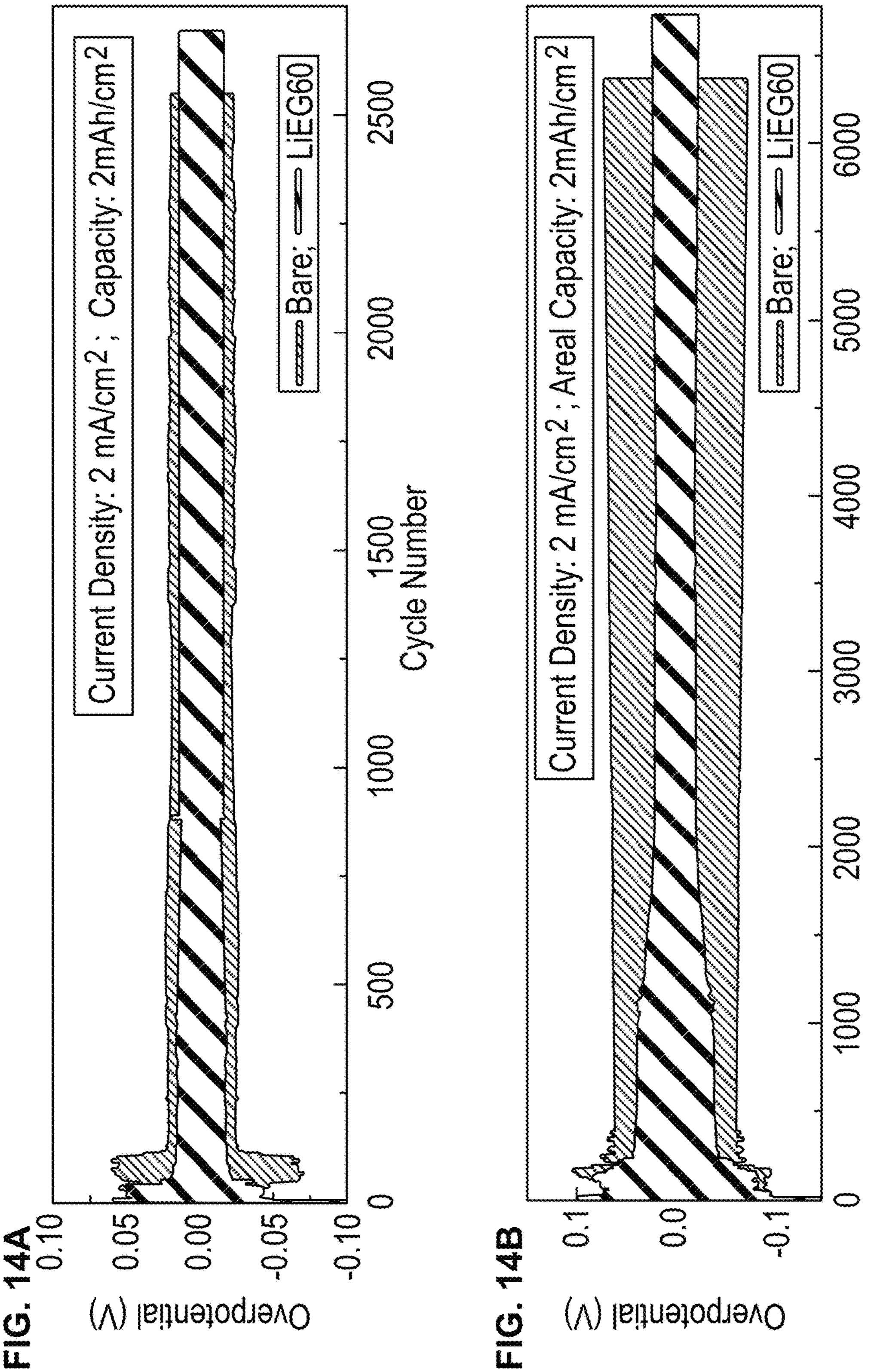
FIG. 14, which includes
FIG. 14A illustrates the comparison of bare Li/Li and LiGL60 symmetric cells in an ether electrolyte, under a current density of 2 $mA/cm^2$ and an areal capacity of 2 $mAh/cm^2$. The results show that the LiGL60 symmetric cell enables a lower stable overpotential. The ether electrolyte is 1 M LITFSI in 1:1 DOL:DME and controlled for 20 μL.
FIG. 14B illustrates the comparison of bare Li/Li and LiGL60 symmetric cells in an ether electrolyte, under a current density of 5 $mA/cm^2$ and an areal capacity of 2 $mAh/cm^2$. The results show that the LiGL60 symmetric cell enables a lower stable overpotential. The ether electrolyte is 1 M LITFSI in 1:1 DOL:DME and controlled for 20 μL.

Using a current density of 2 and 5 $mA/cm^2$ and a capacity of 2 $mAh/cm^2$, results show that the MLD coatings could help maintain lower overpotentials than those of bare Li/Li symmetric cells in the ether electrolyte, 1 M LITFSI in 1:1 DOL:DME, as shown in FIG. 14.

Using a current density of 2 and 5 $mA/cm^2$ and a capacity of 4 $mAh/cm^2$, results show that the MLD coatings could help maintain lower overpotentials than that those of bare Li/Li symmetric cells in the ether electrolyte, 1 M LITFSI in 1:1 DOL:DME, as shown in FIG. 15.

Figures 16, 16A, 16B:
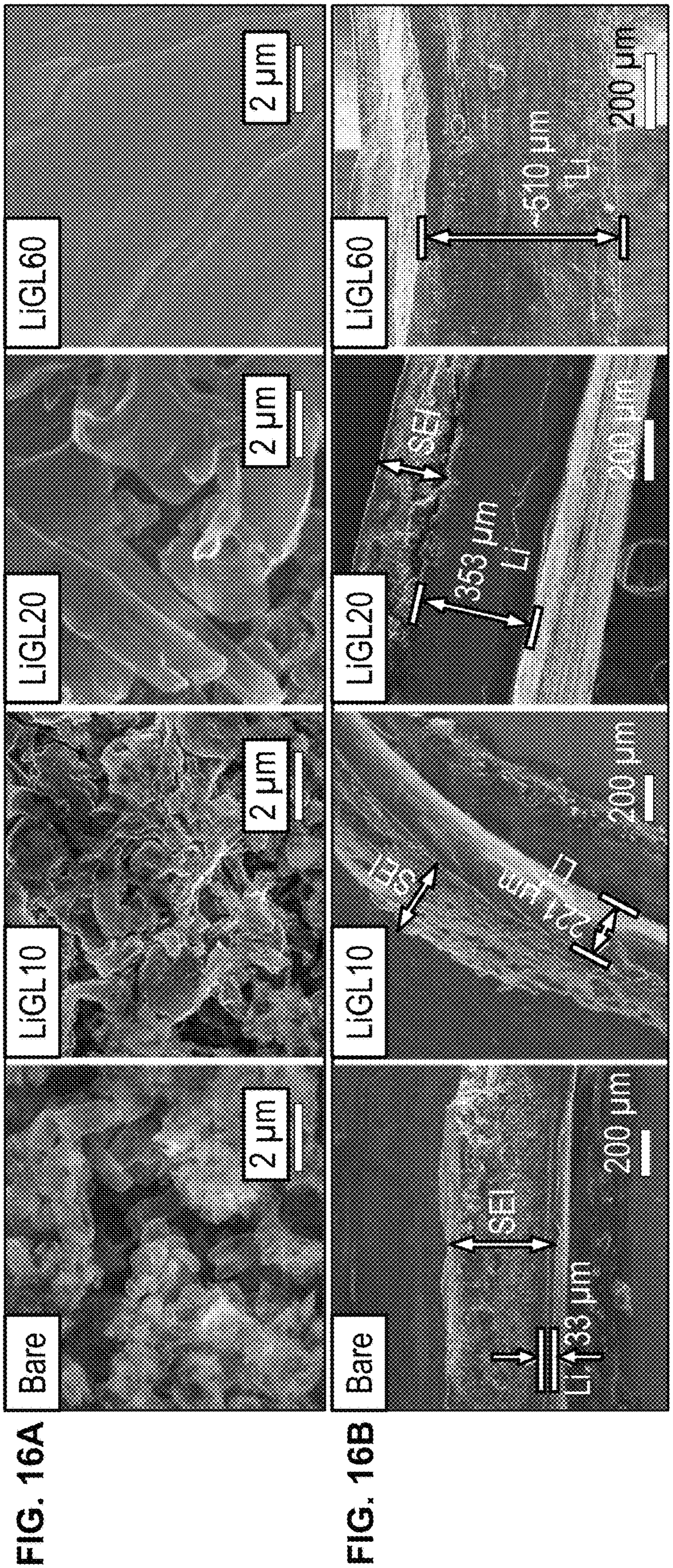
FIG. 16, which includes
FIG. 16A shows the surfaces of the cycled bare, LiGL10, LiGL20, and LiGL60 electrodes after 700 Li-stripping/plating cycles.
FIG. 16B shows the cross sections of the cycled bare, LiGL10, LiGL20, and LiGL60 electrodes after 700 Li-stripping/plating cycles.

Scanning electron microscopy (SEM) was used to observe the surfaces (FIG. 16(*a*)) and the cross sections (FIG. 16(*b*)) of the cycled bare, LiGL10, LiGL20, and LiGL60 electrodes after 700 Li-stripping/plating cycles at a current density of 2 $mA/cm^2$ and an areal capacity of 1 $mAh/cm^2$. Results show that LiGL coatings could protect Li electrodes from corrosion. The thicker the better of the protection effects. There was little SEI and Li dendrites observed from the surface and cross section of the LiGL60 electrode after 700 Li-stripping/plating cycles. In comparison, the bare Li electrode shows serious growth of SEI and dendritic structures.

XPS depth profiling results show that there has a very thick SEI layer formed on the bare Li after 10 Li-stripping/plating cycles (FIG. 16(*c*)). In contrast, results show that there has much less SEI formed on the LiGL-90 electrode after 10 (FIG. 16(*d*)) and 50 (FIG. 16(*e*)) Li-stripping/plating cycles.

Figures 17, 17A, 17B, 17C, 17D:
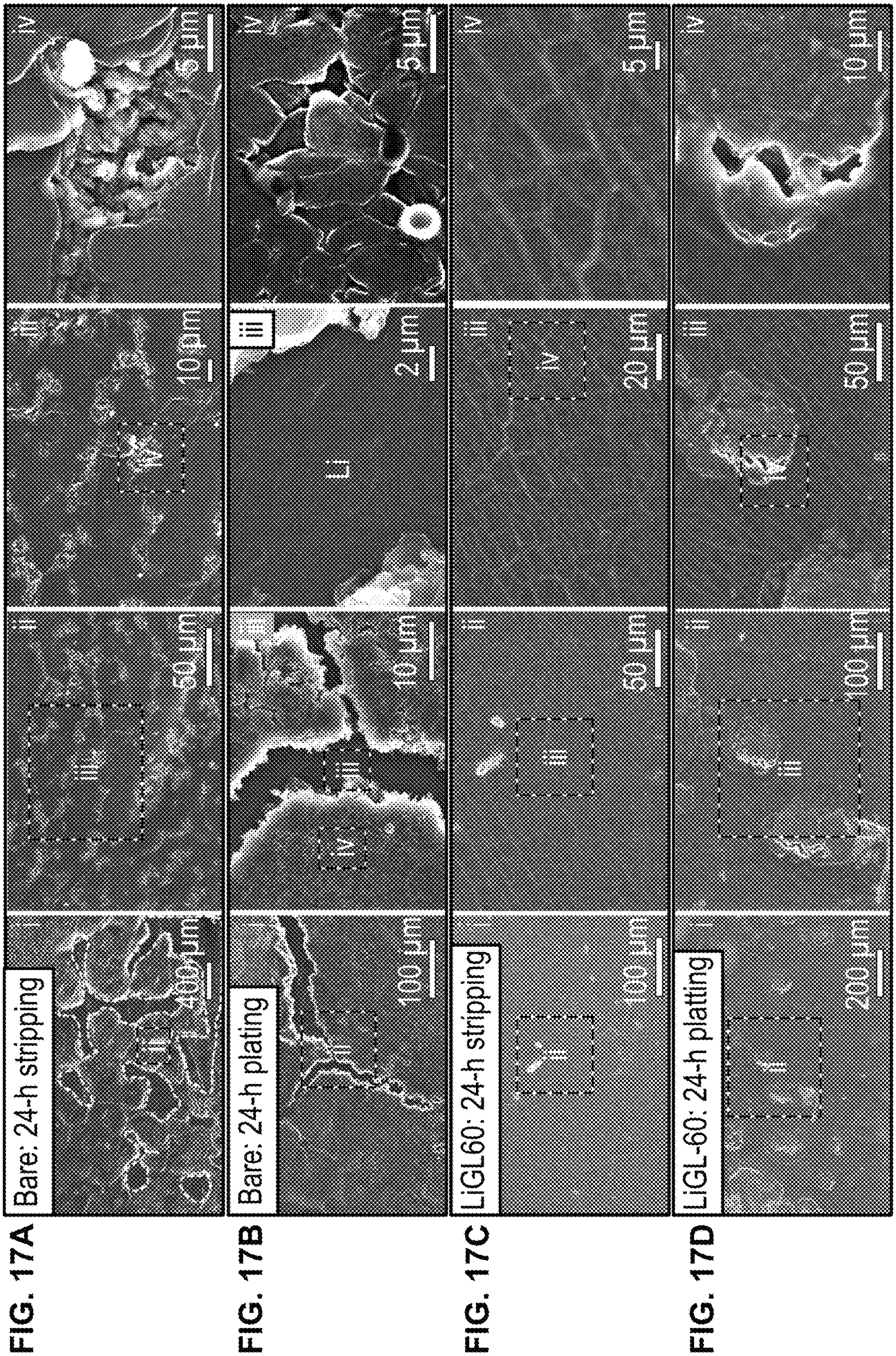
FIG. 17, which includes
FIG. 17A shows the SEM observations of the morphological changes of the bare Li electrode after 24-h stripping at 2 $mA/cm^2$.
FIG. 17B shows the SEM observations of the morphological changes of the bare Li electrode after 24-h plating at 2 $mA/cm^2$.
FIG. 17C shows the SEM observations of the morphological changes of the LiGL60 electrode after 24-h stripping at 2 $mA/cm^2$.
FIG. 17D shows the SEM observations of the morphological changes of the LiGL60 electrode after 24-h plating at 2 $mA/cm^2$.

SEM observations on both Li electrodes of bare Li/Li symmetric cells show that, after a 24-h Li-stripping on one Li electrode (FIG. 17(*a*)) while a 24-h Li-plating on another opposite Li electrode (FIG. 17(*b*)) at a current density of 2 $mA/cm^2$ (i.e., an areal capacity of 48 $mAh/cm^2$), the bare Li electrode after the 24-h Li-stripping (FIG. 17*a*(*i*)) was covered by craters (as circled by dashed lines) and bumps (the areas other than the circles) while there is a large amount of dendritic Li deposited on the bare Li surface after 24-h plating (FIG. 17*b*(*i*)). On the stripping side (FIG. 17(*a*)), the craters are smooth while the bumps are decorated with numerous micro-wells (or micro-holes) mainly in the range of 10-50 μm. These micro-wells are further enlarged to show more details (FIG. 17*a*(*ii*)-(*iv*)). As shown in FIG. 17*a*(*iv*), these micro-wells contain many dendritic structures (or micro-pillars). The craters might be the areas that have stripped Li first and then ceased while the bumps were the areas that did not strip Li at the very beginning but became the new areas for stripping after the craters ceased stripping. Thus, the stripping process on bare Li electrodes is not uniform and the stripping areas change with time. On the plating side, it is observed that the deposited Li was separated from the originally bare Li (FIG. 17*b*(*ii*)) while the originally bare Li surface was intact (FIG. 17*b*(*iii*)). The deposited Li (FIG. 17*b*(*iv*)) was in micron-sized dendritic structures that were squeezed together with clear boundaries. The bare Li surface and the dendritic structures should have been covered by one layer of SEI and the SEI layers have separated them from each other. The formation of this SEI layer consumed Li and the electrolyte.

SEM observations on both Li electrodes of the LiGL60 symmetric cells show that, after a 24-h Li-stripping on one LiGL60 electrode (FIG. 17(*c*)) while a 24-h Li-plating on another opposite LiGL60 electrode (FIG. 17(*d*)) at a current density of 2 $mA/cm^2$ (i.e., an areal capacity of 48 $mAh/cm^2$), the LiGL60 electrode after 24-h Li-stripping (FIG. 17(*c*)) was free of craters and bumps while the opposite LiGL60 electrode after 24-h Li-plating (FIG. 17(*d*)) was generally clean and smooth. These results show that the LiGL60 coatings have well protected both Li electrodes from corrosions; that is, there have no SEI formation and no Li dendritic growth. In addition, these results indicate that the LiGL coatings are ionically conductive but electronically insulating. There were fractures observed on both LiGL60 electrodes, which were created by the pressing force during assembling process.

Figures 18, 18A, 18B, 18C, 18D:
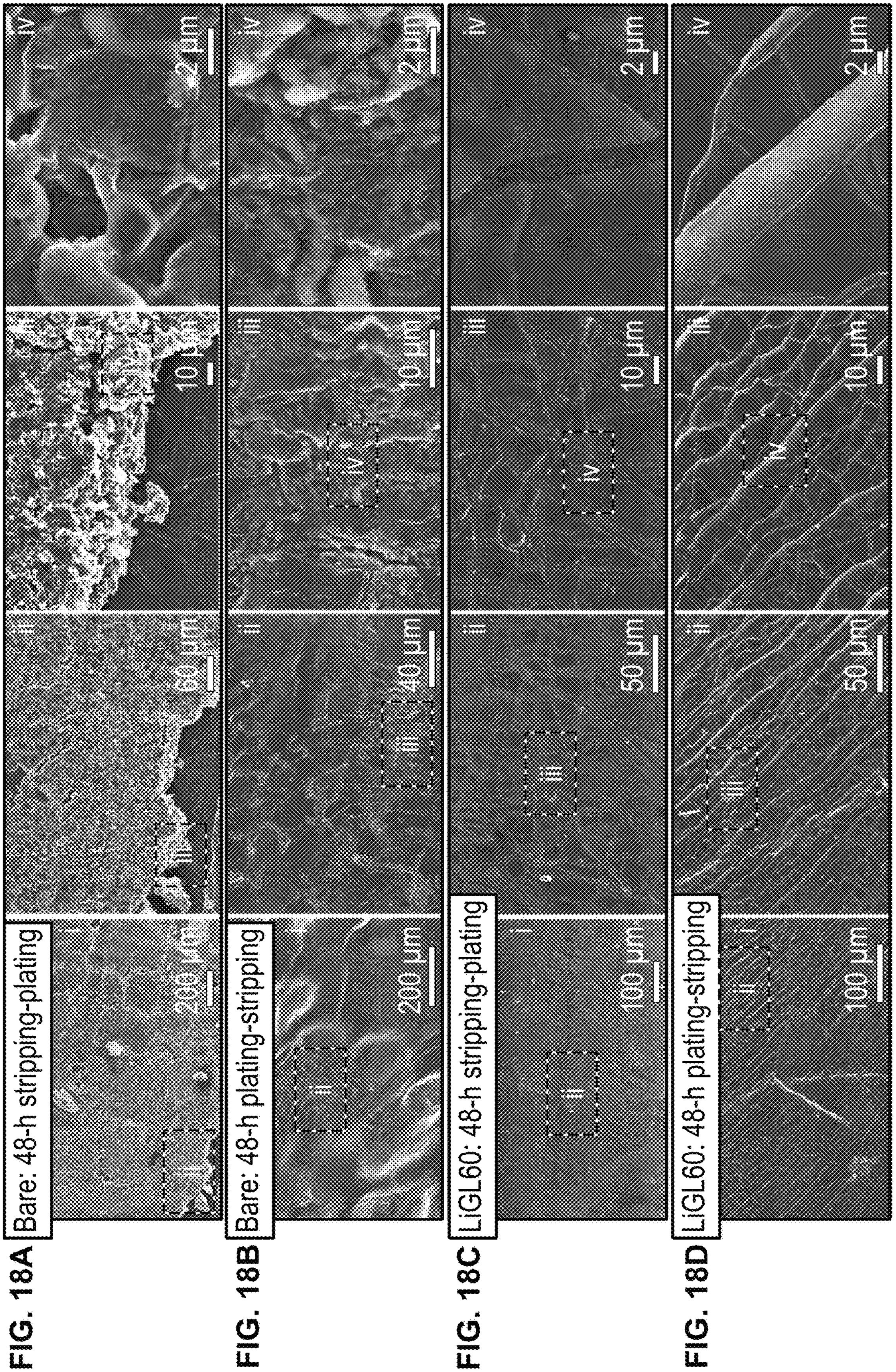
FIG. 18, which includes
FIG. 18A shows the SEM observations of the morphological changes of the bare Li electrode after 48-h stripping-plating (24-h stripping and 24-h plating) at 2 $mA/cm^2$.
FIG. 18B shows the SEM observations of the morphological changes of the bare Li electrode after 48-h plating-stripping (24-h plating and 24-h stripping) at 2 $mA/cm^2$.
FIG. 18C shows the SEM observations of the morphological changes of the LiGL60 electrode after 48-h stripping-plating (24-h stripping and 24-h plating) at 2 $mA/cm^2$.
FIG. 18D shows the SEM observations of the morphological changes of the LiGL60 electrode after 48-h plating-stripping (24-h plating and 24-h stripping) at 2 $mA/cm^2$.

SEM observations on both Li electrodes of bare Li/Li symmetric cells show that, after a 48-h stripping-plating (24-h Li-striping followed by 24-h Li-plating) on one Li electrode (FIG. 18(*a*)) while a 48-h plating-stripping (24-h Li-plating followed by 24-h Li-stripping) on another opposite Li electrode (FIG. 18(*b*)) at a current density of 2 $mA/cm^2$ (i.e., an areal capacity of 48 $mAh/cm^2$), the bare Li after 48-h stripping-plating (FIG. 18*a*) exhibited the similar morphology as shown in FIG. 17*b* and showed a thick dendritic Li layer on the top of the bare Li electrode, while the opposite bare Li after 48-h plating-stripping (FIG. 18*b*) has a similar appearance as shown in FIG. 17*a* and showed numerous craters and bumps covered by many micro-wells.

SEM observations on both Li electrodes of the LiGL60 symmetric cells show that, after a 48-h stripping-plating (24-h Li-striping followed by 24-h Li-plating) on one LiGL60 electrode (FIG. 18(*c*)) while a 48-h plating-stripping (24-h Li-plating followed by 24-h Li-stripping) on another opposite LiGL60 electrode (FIG. 18(*d*)) at a current density of 2 $mA/cm^2$ (i.e., an areal capacity of 48 $mAh/cm^2$), the LiGL60 electrode after 48-h stripping-plating (FIG. 18*c*) was clean on its surface and covered with numerous small pieces of LiGL coatings mainly in the range of 10-50 μm while the LiGL60 electrode after 48-h plating-stripping (FIG. 18*d*) was similarly clean and covered with small pieces of the LiGL film. The fractures between the LiGL pieces are 1-2 μm. These results well demonstrate that the LiGL coatings with suitable thicknesses are very effective to protect Li electrodes from dendritic growth and SEI formation.

The Li-Conducting Inorganic Films of $Li_xAl_yS$ Via ALD

Figures 19, 19A, 19B:
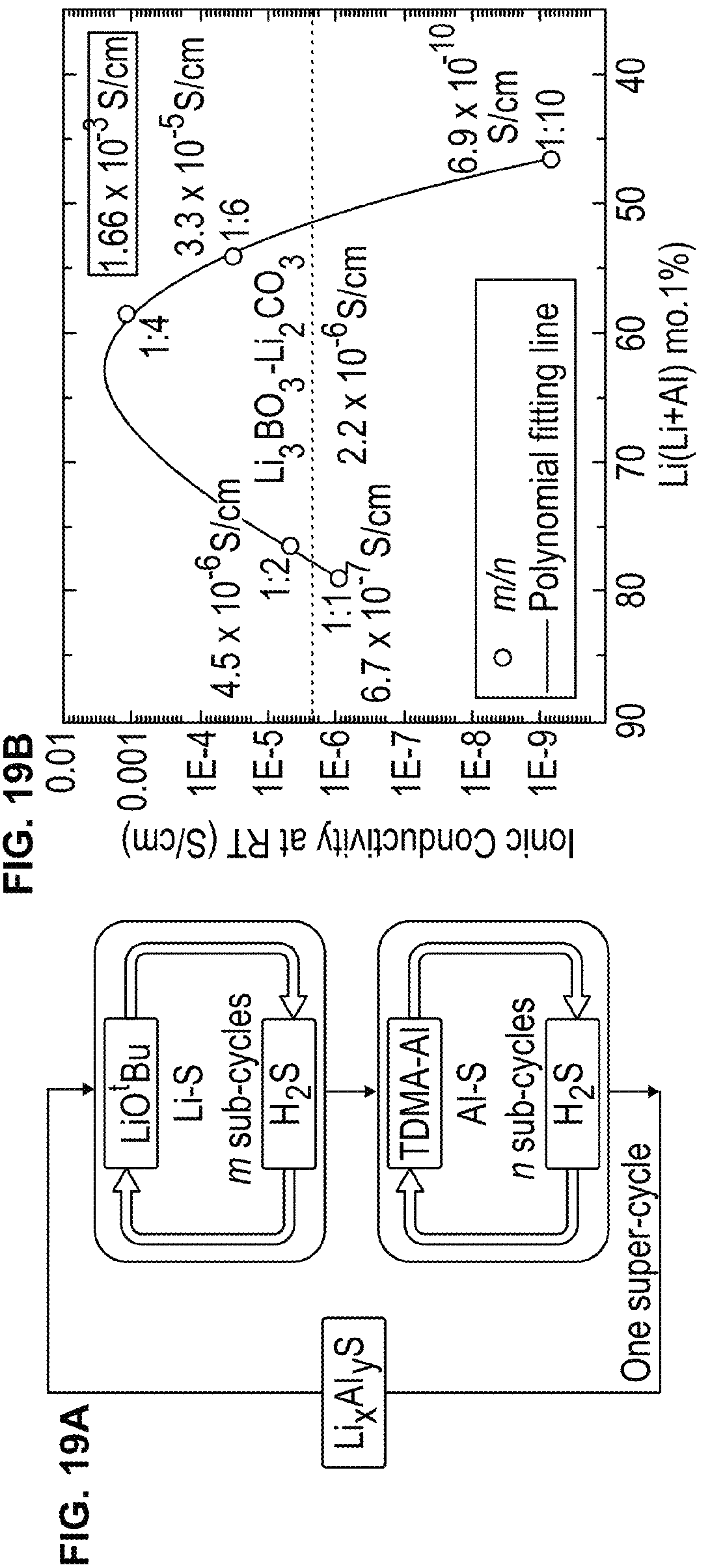
FIG. 19, which includes
FIG. 19A is a schematic illustration of $Li_xAl_yS$ ALD processes for an embodiment of the present invention. Various $Li_xAl_yS$ can be produced through tuning the sub-cycle ratio m/n. The different $Li_xAl_yS$ compounds are named as (m:n)LiAlS, where m and n are the sub-cycles of the sub-ALD of Li—S and the sub-ALD of Al—S.
FIG. 19B shows how the ionic conductivity of $Li_xAl_yS$ films varies with their compositions at room temperature (RT). (1:4)LiAlS enables the highest ionic conductivity, $1.66\times10^{-3}$ S/cm at RT.

Another embodiment of the present invention concerns a super-ALD process for growing $Li_xAl_yS$ in which the sub-cycle ratio of m/n, as shown in FIG. 19*a*, could be adjusted for different $Li_xAl_yS$ films with accurately controlled compositions. The resultant $Li_xAl_yS$ films have different ionic conductivities at room temperature (RT) and accomplished the highest ionic conductivity of $1.66\times10^{-3}$ S/cm when the sub-cycle ratio m/n is 1:4, 750 times higher than that of the ALD $Li_3BO_3$—$LiCO_3$ films reported for the highest ionic conductivity of $2.2\times10^{-6}$ S/cm previously, as shown in FIG. 19*b*.

Figure 20:
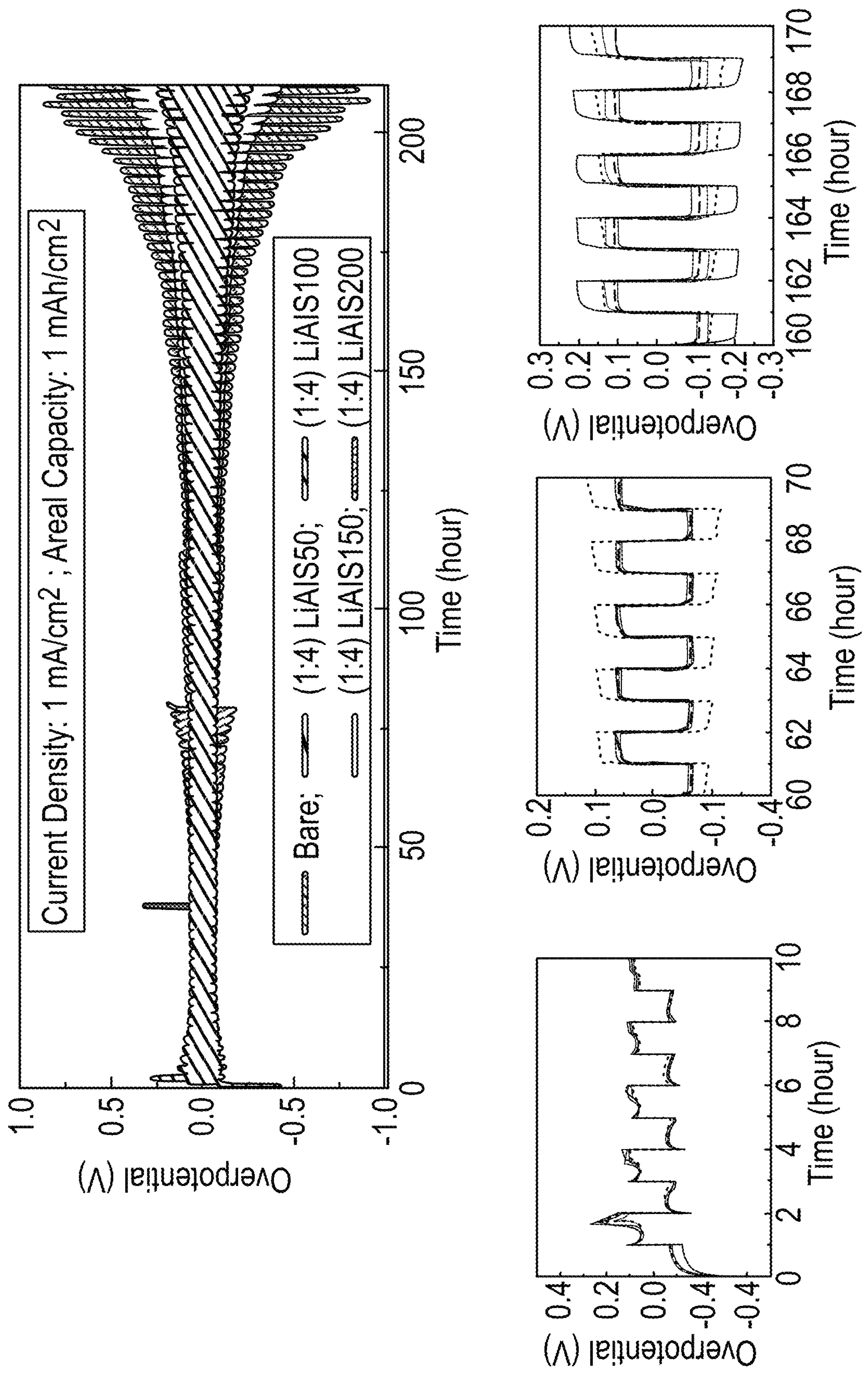
FIG. 20 illustrates the effects of (1:4)LiAlS on the stability of the symmetric Li/Li cells due to different ALD super-cycles, compared to bare Li/Li cells in a carbonate electrolyte. The ALD-(1:4)LiAlS films were coated on both Li electrodes of the Li/Li symmetric cells for different ALD cycles: 50, 100, 150, and 200. The resultant (1:4)LiAlS-coated Li/Li symmetric cells were then named as (1:4) LiAlS50, (1:4)LiAlS100, (1:4)LiAlS150, and (1:4)LiAlS200, respectively. The results clearly show that the ALD (1:4)LiAlS coatings perform stably when their ALD cycles are less than 150 super-cycles. The carbonate electrolyte is 1.2 M LiPF6 in 3:7 EC:EMC and controlled for 20 μL. The testing current density is 1 mA/cm$^2$ and the testing capacity is 1 mAh/cm$^2$.
Figure 21:
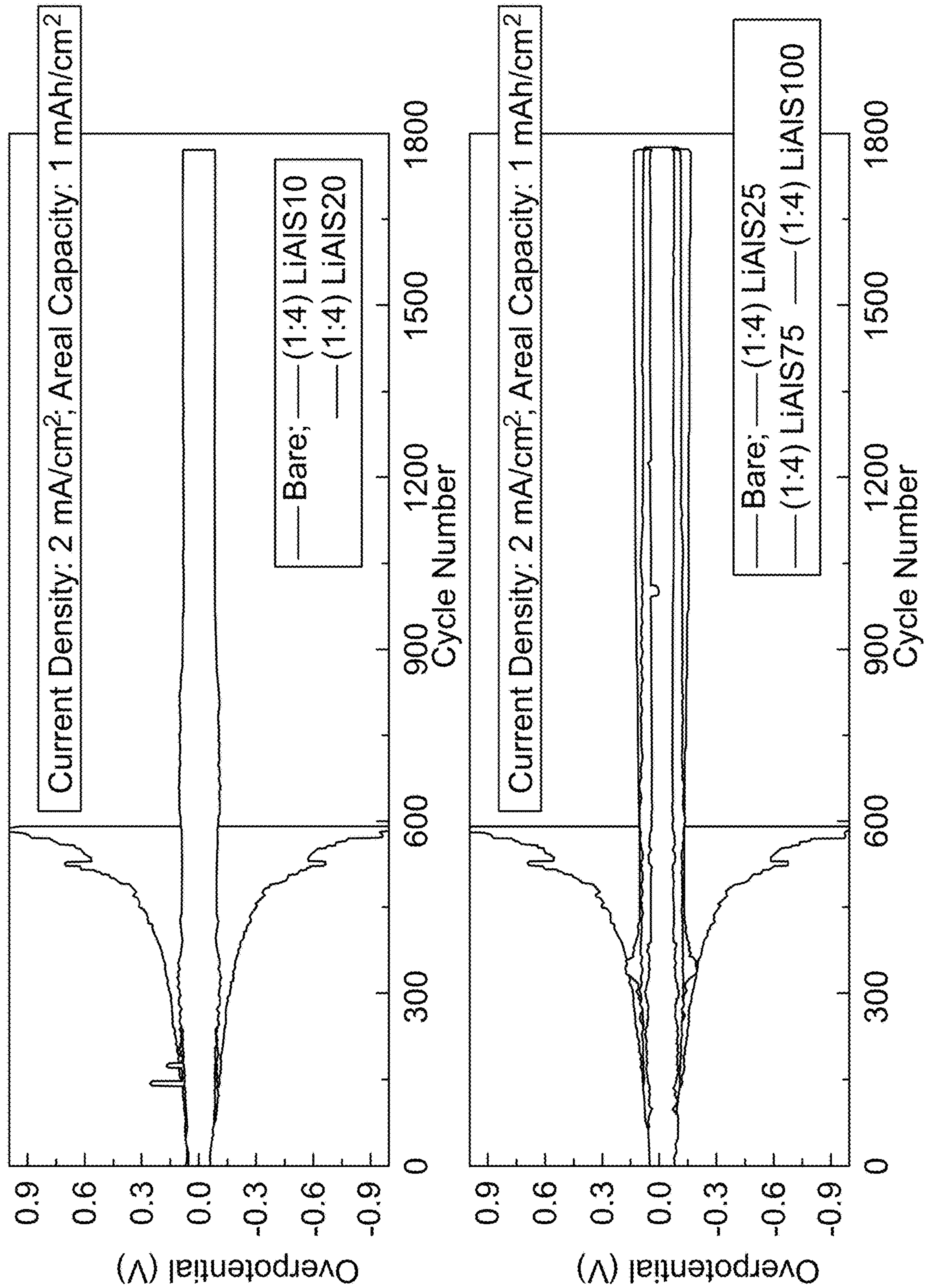
FIG. 21 illustrates the effects of the (1:4)LiAlS coatings on the stability of the symmetric Li/Li cells due to different ALD super-cycles, compared to bare Li/Li cells in an ether electrolyte. The ALD-(1:4)LiAlS films were coated on both Li electrodes of the Li/Li symmetric cells for different ALD super-cycles: 10, 20, 25, 75, and 100. The resultant (1:4) LiAlS-coated Li/Li symmetric cells were then named as (1:4)LiAlS10, (1:4)LiAlS20, (1:4)LiAlS25, (1:4)LiAlS75, and (1:4)LiAlS100, respectively. The results clearly show that the ALD (1:4)LiAlS coatings perform stably when their ALD cycles are more than 10 super-cycles of (1:4)LiAlS. The ether electrolyte is 1 M LITFSI in 1:1 DOL:DME and controlled for 20 μL. The testing current density is 2 mA/cm$^2$ and the testing capacity is 1 mAh/cm$^2$.
Figure 22:
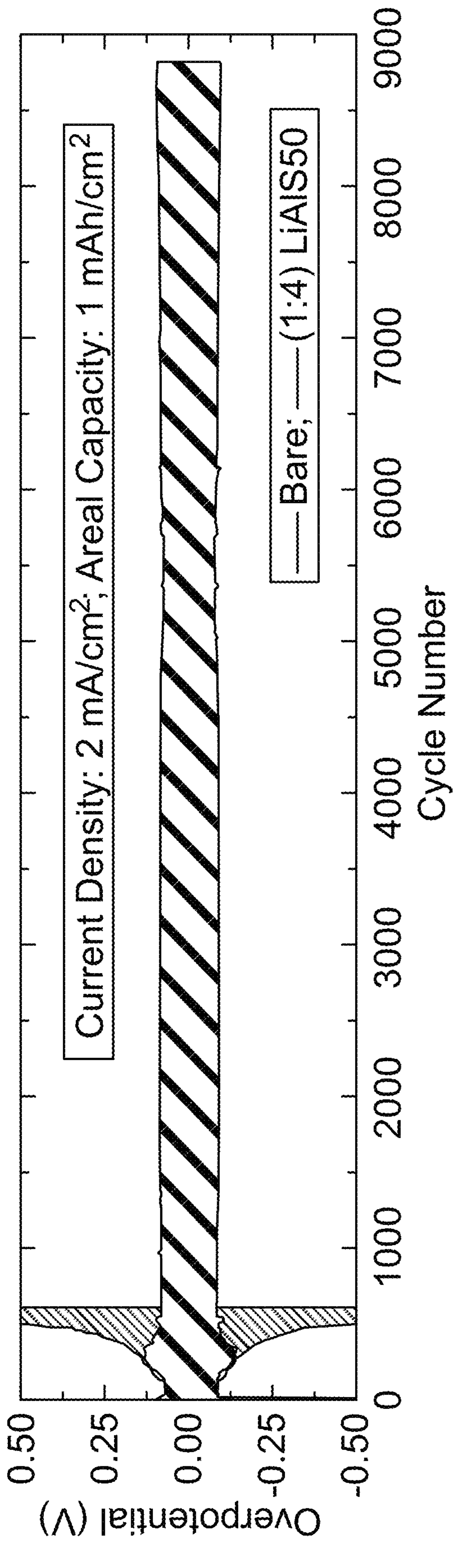
FIG. 22 illustrates the effects of the (1:4)LiAlS50 coating on the stability of the symmetric Li/Li cells, compared to bare Li/Li cells in an ether electrolyte. The (1:4)LiAlS50 symmetric cell achieved a super stable cyclability close to 9000 Li-stripping/plating cycles. The ether electrolyte is 1 M LITFSI in 1:1 DOL:DME and controlled for 20 μL. The testing current density is 2 mA/cm$^2$ and the testing capacity is 1 mAh/cm$^2$.

It has also been found that the effects of 1:4 $Li_xAl_yS$ (i.e., (1:4)LiAlS) coating on Li metal electrodes in symmetric Li/Li cells in the carbonate and ether electrolytes are beneficial. Using the carbonate electrolyte of 1.2 M $LiPF_6$ in 3:7 EC: EMC, as illustrated in FIG. 20, the (1:4)LiAlS coatings can evidently improve the cyclability of Li/Li cells with thin-film thicknesses (50-150 super-cycles corresponding to 5-15 nm), compared to the bare Li/Li cell. Using the ether electrolyte of 1 M LITFSI in 1:1 DOL: DME, as illustrated in FIG. 21 and FIG. 22, the (1:4)LiAlS coatings can dramatically improve the cyclability of Li/Li cells with thin-film thicknesses (10-100 super-cycles corresponding to 1-10 nm), compared to the bare Li/Li cell.

The Li-containing inorganic-organic hybrid films used in Li batteries of the present invention may be formed using both ALD and MLD. The embodiments of the present invention produce advanced hybrid inorganic-organic thin films on electrodes such as the cathode, anode or both through combining ALD and MLD, and the films enable multiple benefits in mechanical properties, ionic conductivity, stability in liquid electrolytes, and compatibility with liquid electrolytes.

Figure 23:
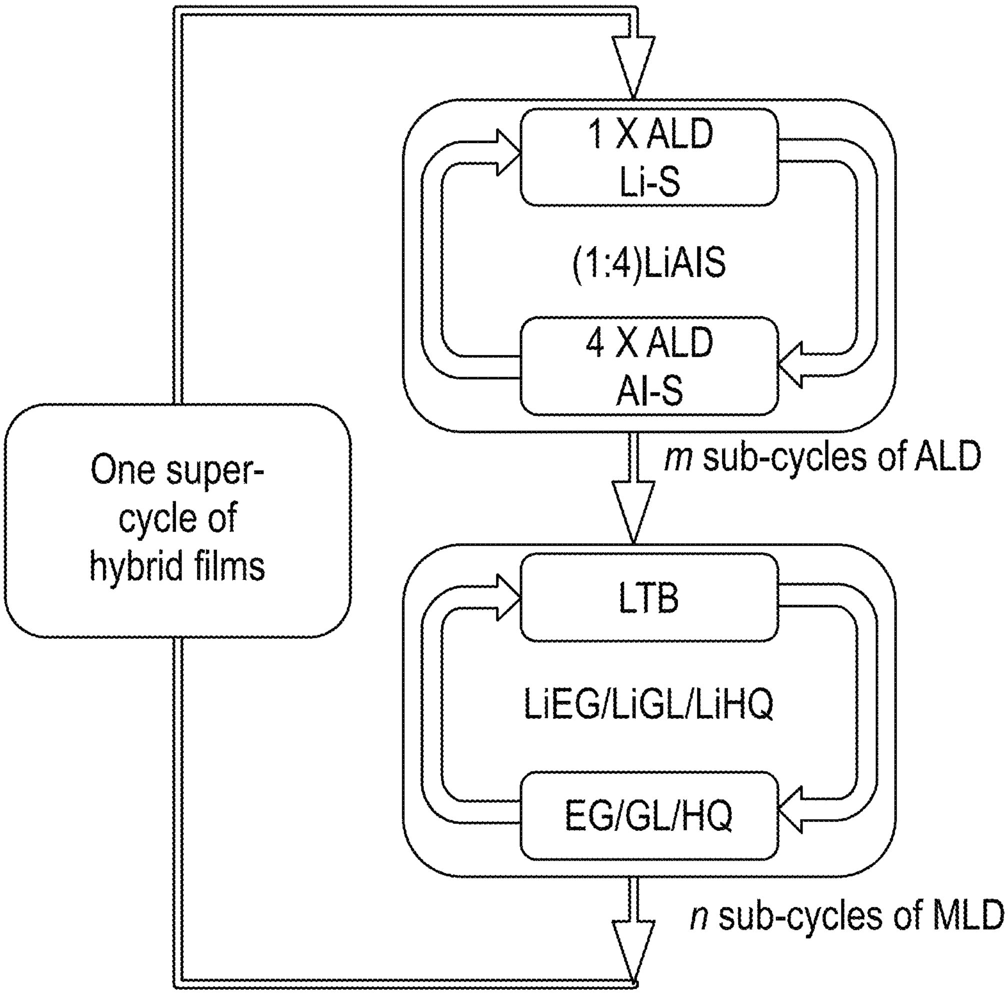
FIG. 23 illustrates a combined ALD-MLD approach for growing hybrid Li-conducting films for an embodiment of the present invention.

As shown in FIG. 23, to achieve a desirable hybrid Li-conducting coating on an electrode of a battery, in a preferred embodiment, a combination of an MLD-deposited Li-conducting polymeric film with an ALD-deposited Li-conducting inorganic film may be used on the electrode. The Li-containing polymeric films may be LiEG, LiGL, and LiHQ and combinations thereof. Additionally, other aspects of the present invention provide superionic inorganic coating of (1:4)LiAlS using ALD. In other embodiments, the present invention combines the (1:4)LiAlS with one of the three Li-containing polymeric films (i.e., LiEG, LiGL, and LiHQ), as illustrated in FIG. 23. This allows for the tuning of the ALD/MLD sub-cycle ratios to achieve desired ionic conductivity, mechanical properties, and chemical stability.

Figure 24:
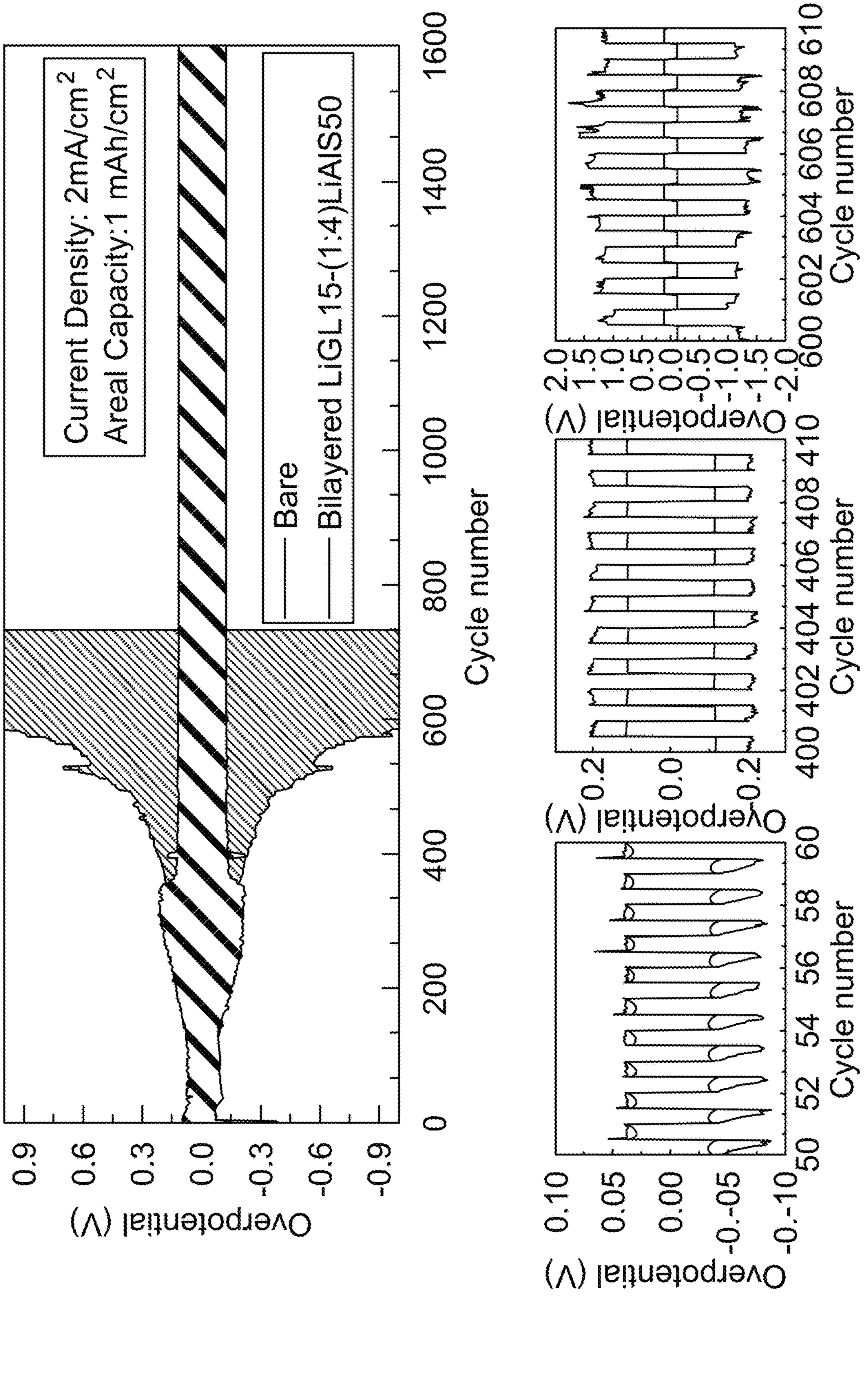
FIG. 24 illustrates effects of the hybrid Li-conducting film of bilayered LiGL15-(1:4)LiAlS50 coating on the stability of the symmetric Li/Li cells, compared to bare Li/Li cells in an ether electrolyte. The bilayered LiGL15-(1:4)LiAlS50 coating was deposited by the combined ALD-MLD approach. The bilayered LiGL15-(1:4)LiAlS50 symmetric cell achieved a super stable cyclability of 1,600 Li-stripping/plating cycles. The ether electrolyte is 1 M LITFSI in 1:1 DOL:DME and controlled for 20 μL. The testing current density is 2 mA/cm$^2$ and the testing capacity is 1 mAh/cm$^2$.

It has also been found that the effects of the hybrid Li-conducting film of bilayered LiGL15-(1:4)LiAlS50 coating on Li metal electrodes in symmetric Li/Li cells in the ether electrolyte is beneficial. Using the ether electrolyte of 1 M LITFSI in 1:1 DOL: DME, as illustrated in FIG. 24, the bilayered LiGL15-(1:4)LiAlS50 coating can dramatically improve the cyclability of Li/Li cells with thin-film thicknesses (15-MLD-cycle LiGL and 50-super-cycle (1:4)LiAlS corresponding to ~50 nm), compared to the bare Li/Li cell.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A battery comprising:

at least one organic liquid electrolyte; and at least one Li anode, said Li anode coated with a protective lithium-containing polymeric film; said protective lithium-containing polymeric film forming a uniform, conformal, and multi-layered coverage over said at least one Li anode;

said protective lithium-containing polymeric film comprising unit structures selected from the group consisting of:

$(CH_2CH_2)(OLi)_2$, as defined by the following bracketed unit structure:

(LiEG)

$(C_6H_4)(OLi)_2$, as defined by the following bracketed unit structure:

(LiHQ)

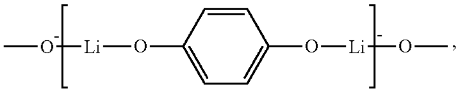

$(CH_2CHCH_2)(OLi)_3$, as defined by the following bracketed unit structure:

(LiGL)

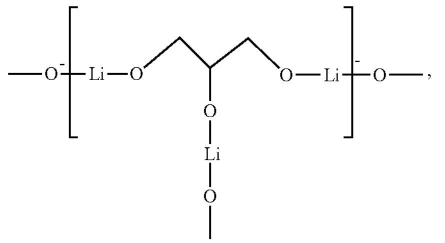

or combinations thereof; and said protective lithium-containing polymeric film comprising at least 10 layers.

2. The battery of claim 1 wherein said unit structure of said protective Li-containing polymer film comprises LiEG.

3. The battery of claim 1 wherein said unit structure of said protective Li-containing polymer film comprises LiHQ.

4. The battery of claim 1 wherein said unit structure of said protective Li-containing polymer film comprises LiGL.

5. The battery of claim 1 wherein said protective Li-containing polymer film does not function as the electrolyte.

6. The battery of claim 1 wherein said organic liquid electrolyte comprises a carbonate electrolyte.

7. The battery of claim 6 wherein said carbonate electrolyte comprises 1.2 M lithium hexafluorophosphate ($LiPF_6$) in the mixture of ethylene carbonate (EC) and ethyl methyl carbonate (EMC) (3:7 EC:EMC in weight).

8. The battery of claim 1 wherein said organic liquid electrolyte comprises an ether electrolyte.

9. The battery of claim 8 wherein said ether electrolyte comprises 1 M lithium bis(trifluoromethanesulfonyl)imide (LITFSI) in dioxolane (DOL) and dimethoxyethane (DME) (1:1 DOL:DME in volume).

10. The battery of claim 1 wherein said protective lithium-containing polymeric film enables Li-ion transportation to said at least one Li anode; has sufficient mechanical strength to inhibit Li-dendritic growth; and has sufficient elasticity and flexibility to accommodate a volume change of Li stripping.

11. The battery of claim 1 wherein said protective lithium-containing polymeric film is deposited on Li anodes directly at low temperatures less than 180° C.

12. The battery of claim 1, wherein said protective lithium-containing polymeric film comprises at least 20 layers.

13. The battery of claim 1, wherein said protective lithium-containing polymeric film comprises unit structures selected from the group consisting of LiHQ, LiGL, or combinations thereof.

* * * * *